May 4, 1926.
O. MALCHER
COMPUTING MECHANISM FOR WEIGHING SCALES
Filed Dec. 15, 1919
1,582,999
16 Sheets-Sheet 2
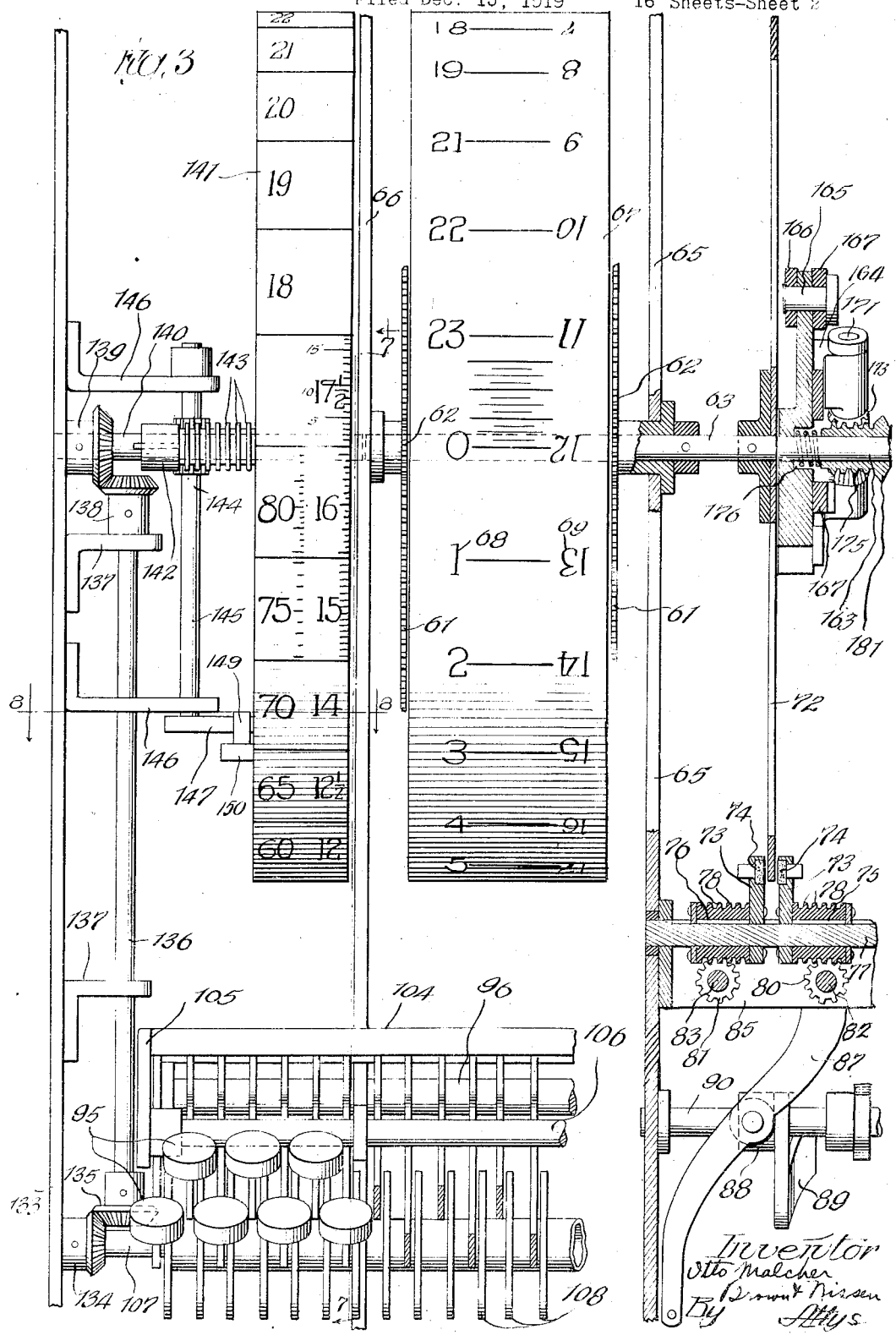

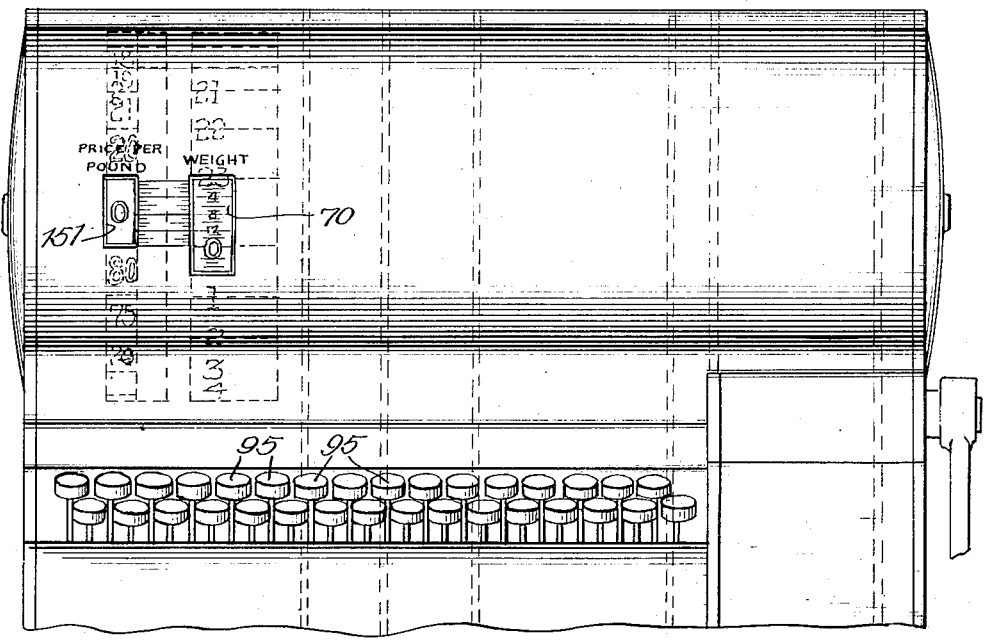
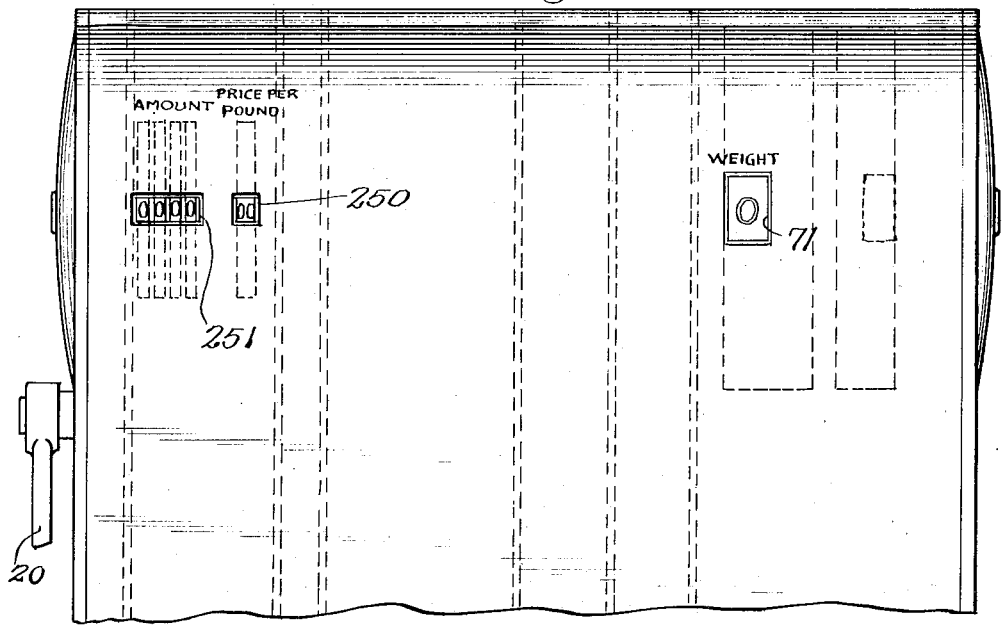

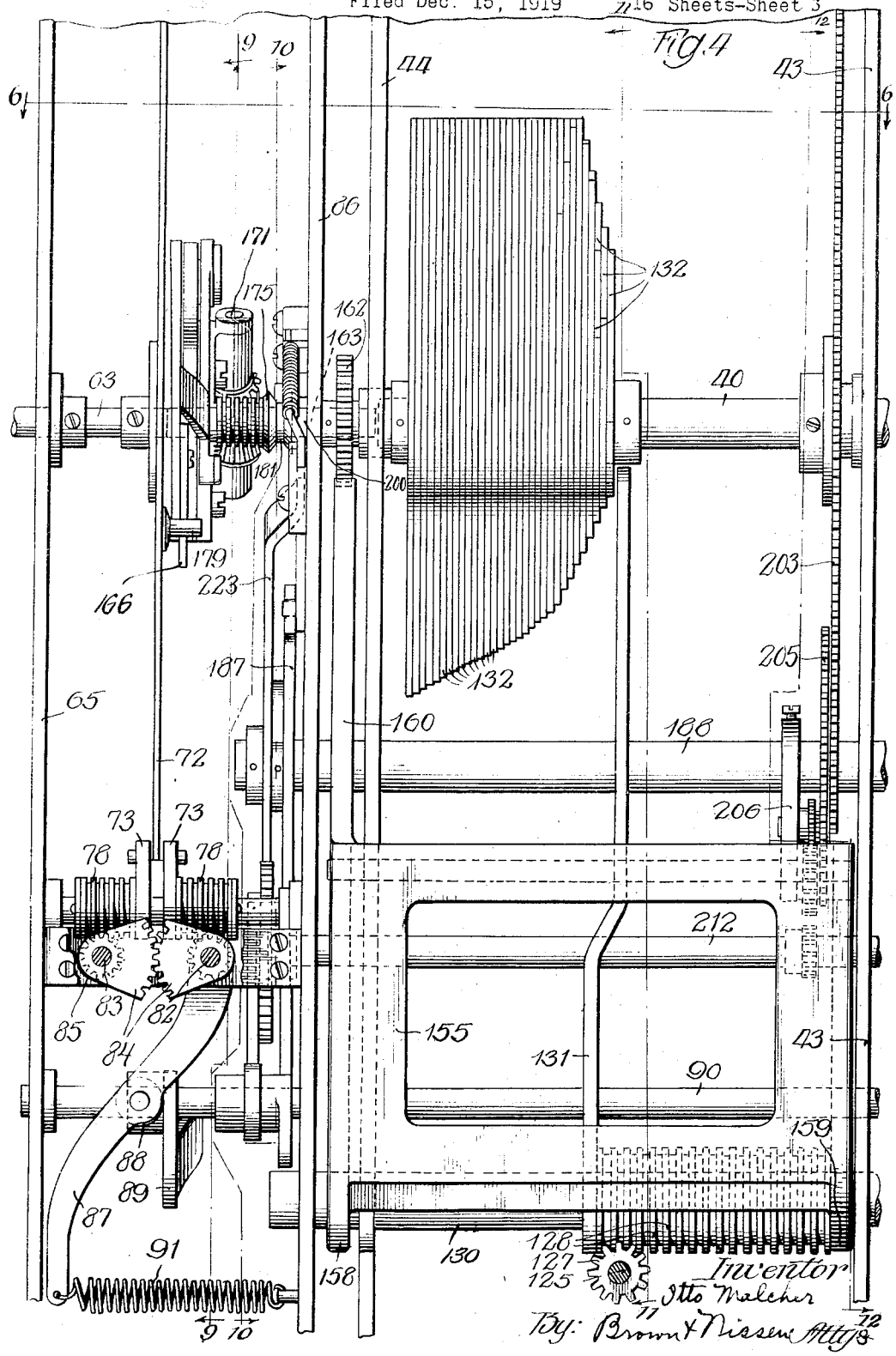

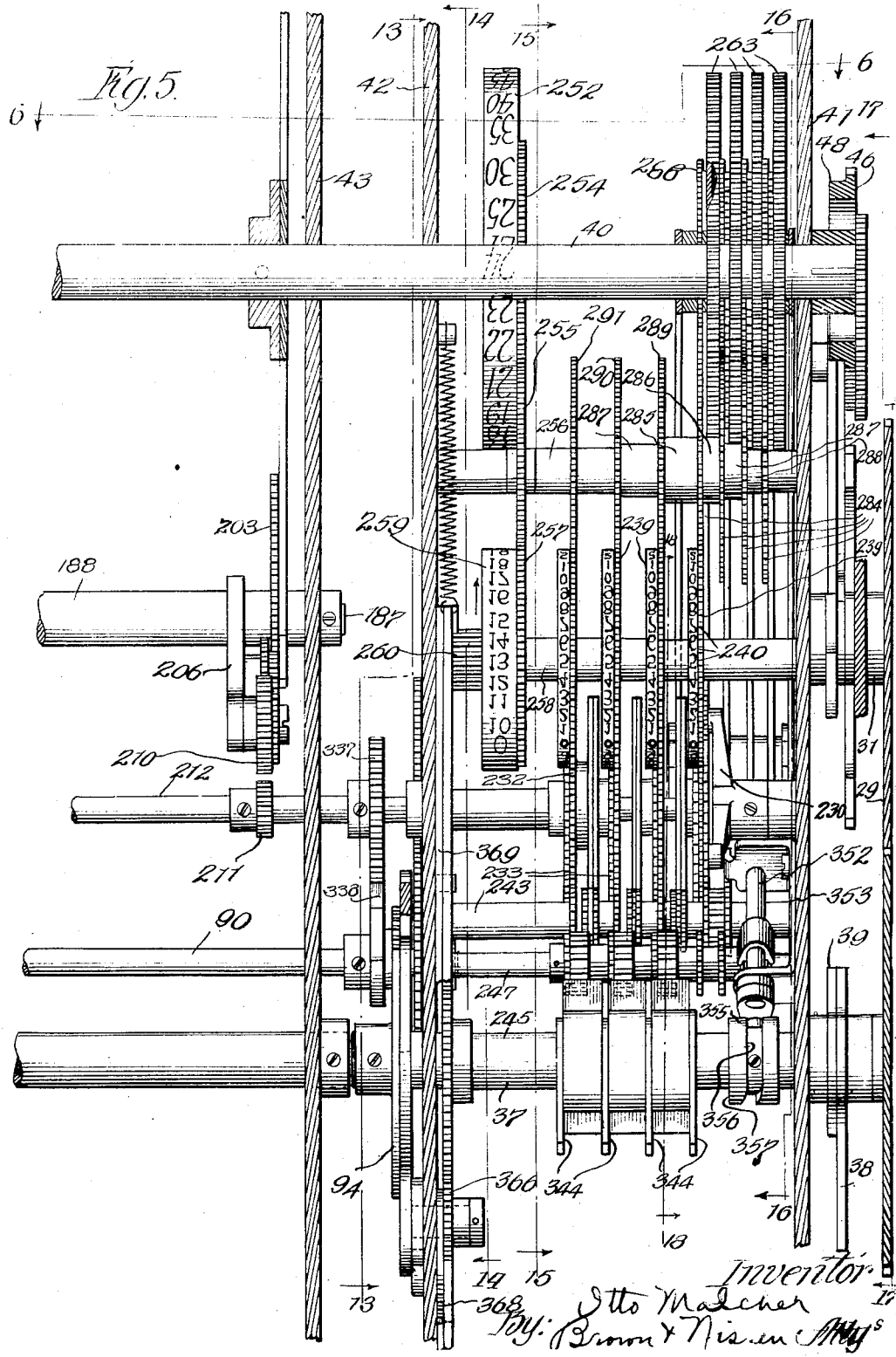

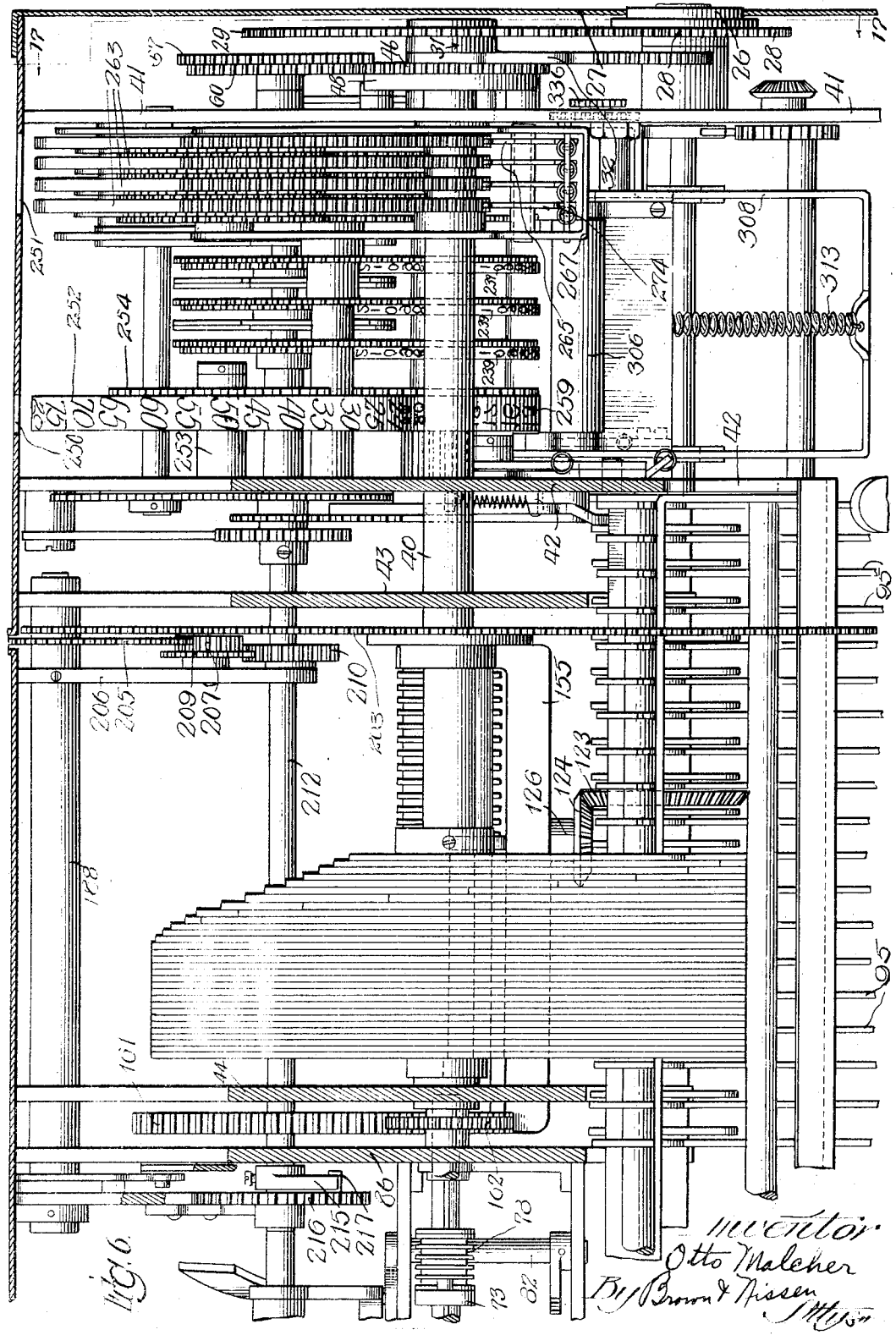

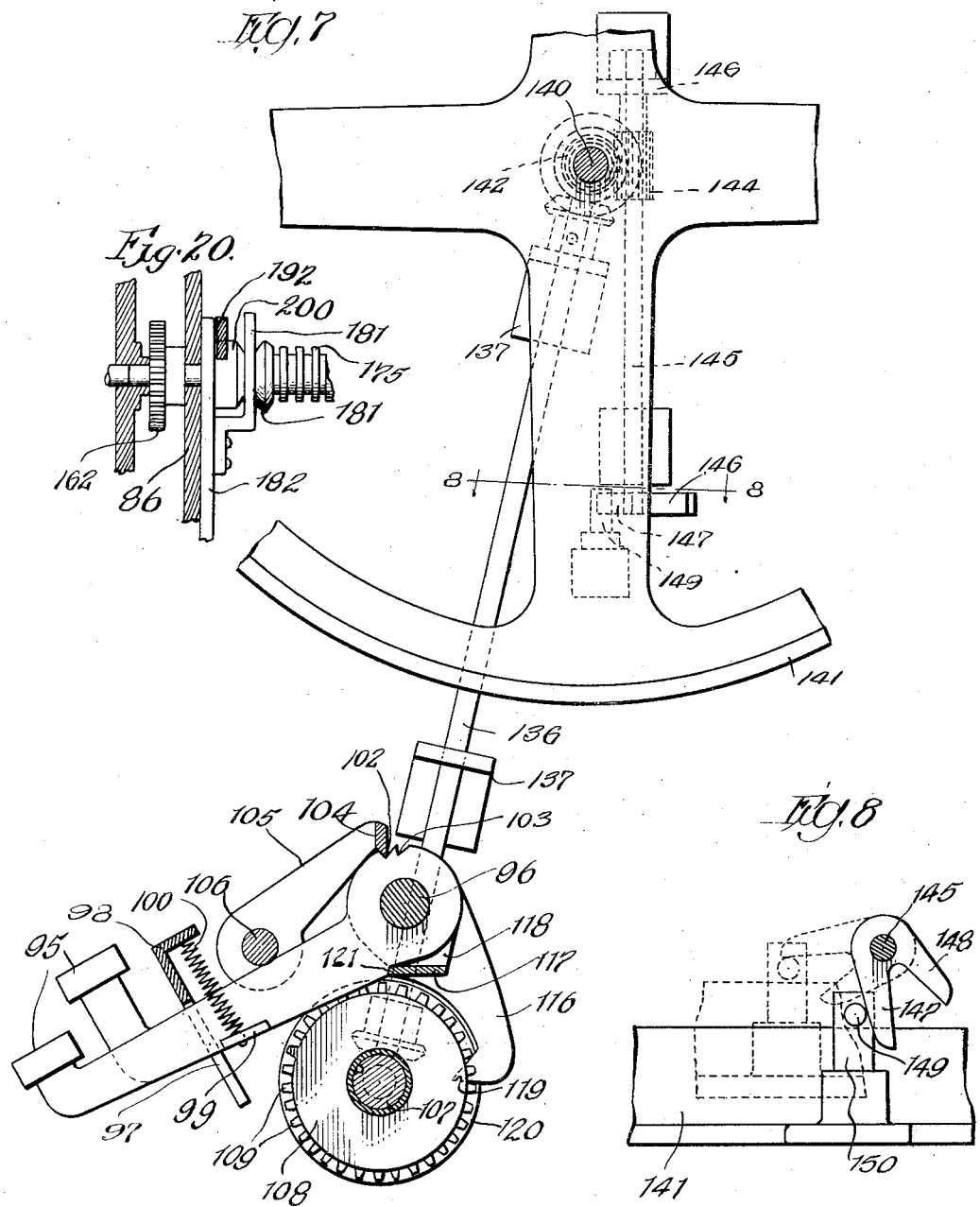

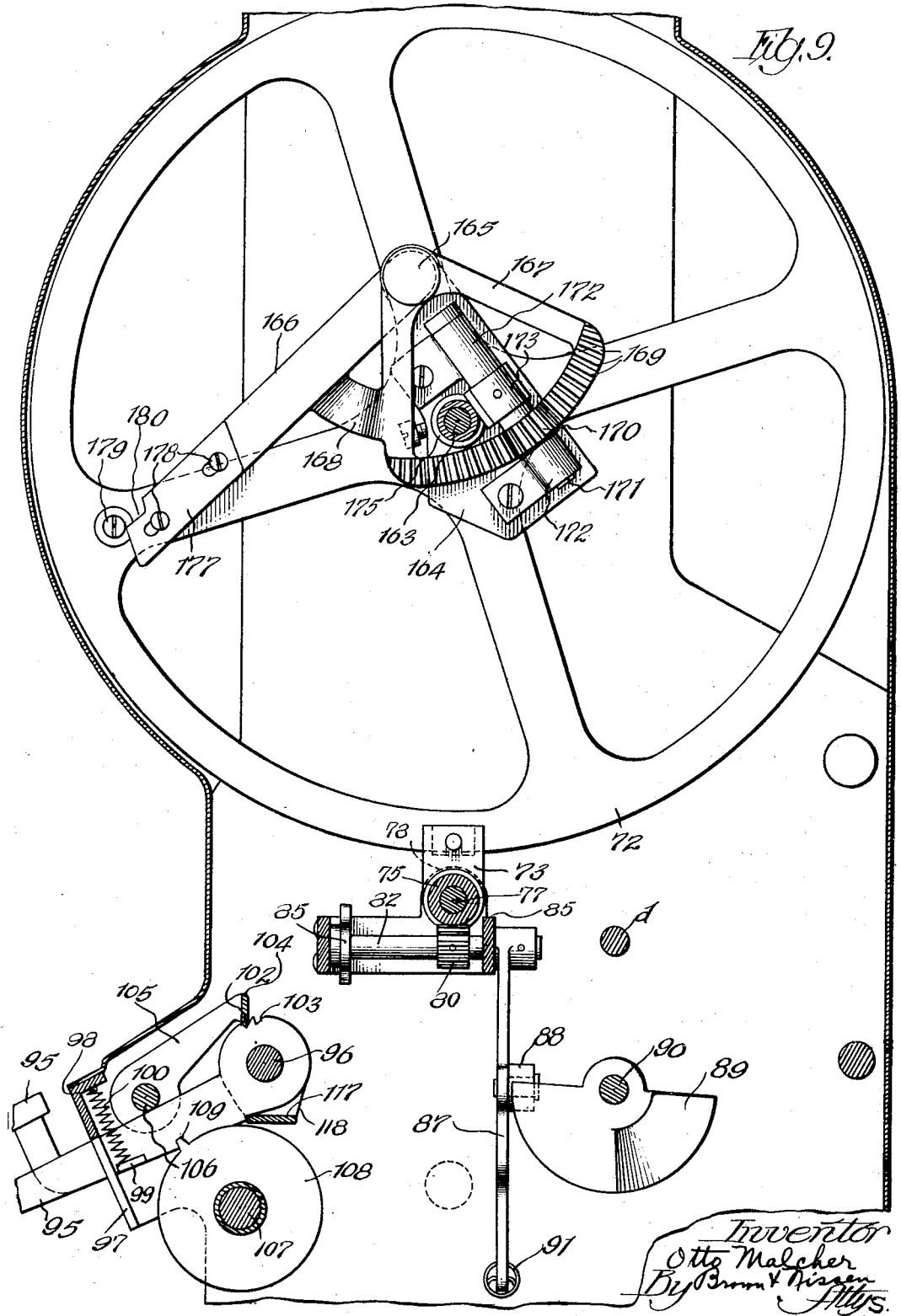

May 4, 1926.

O. MALCHER 1,582,999

COMPUTING MECHANISM FOR WEIGHING SCALES

Filed Dec. 15, 1919    16 Sheets-Sheet 11

Inventor
Otto Malcher
By Brown & Nissen
Attys

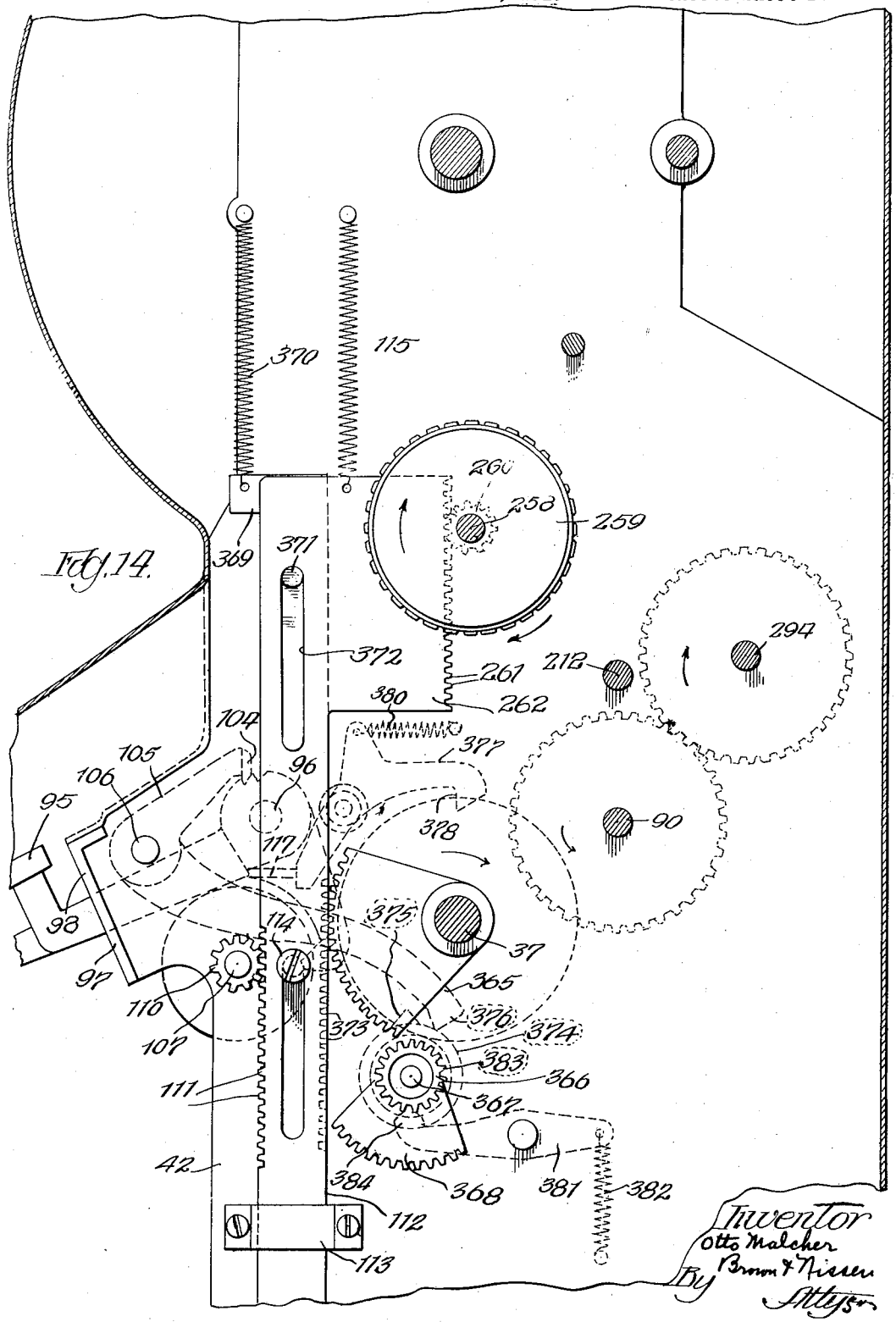

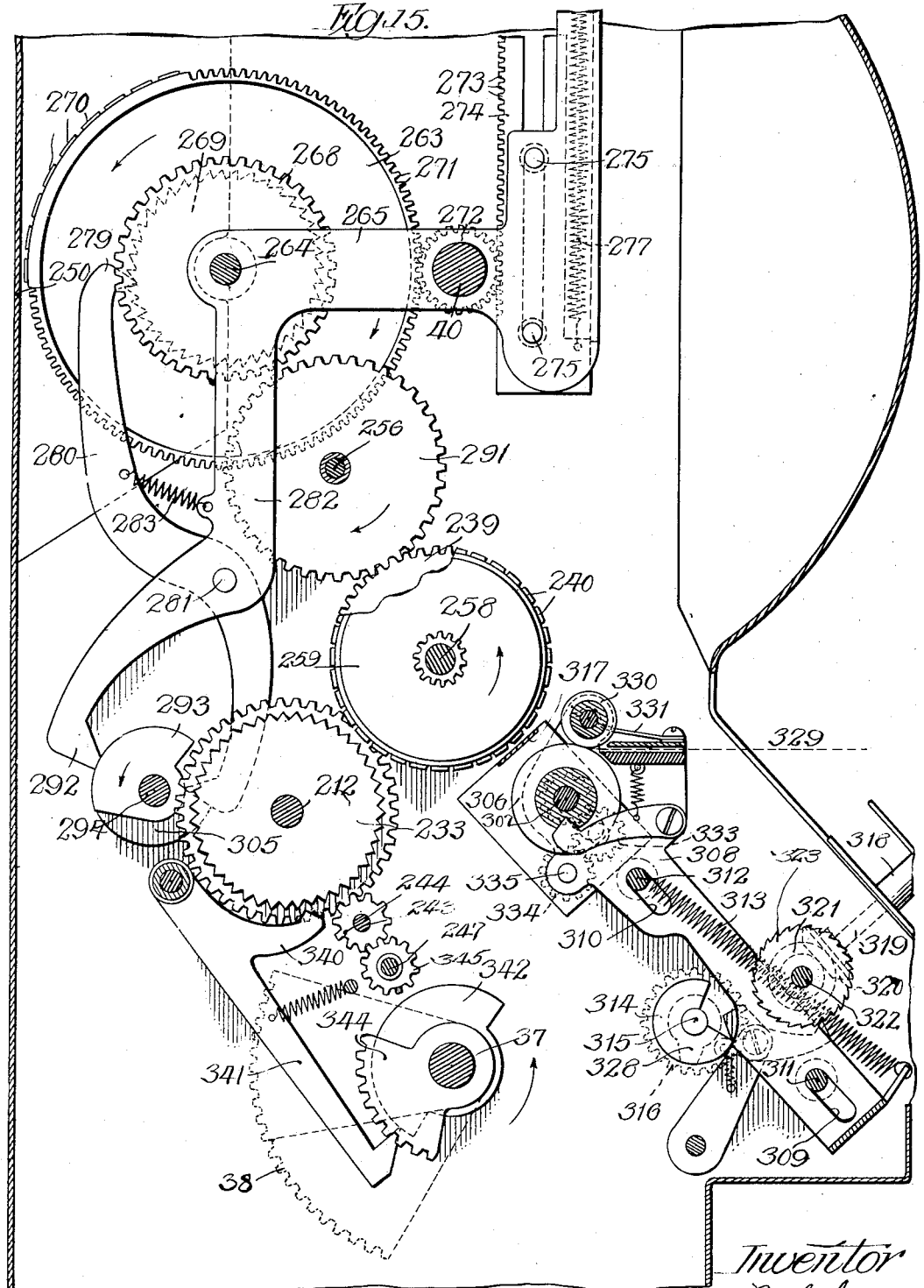

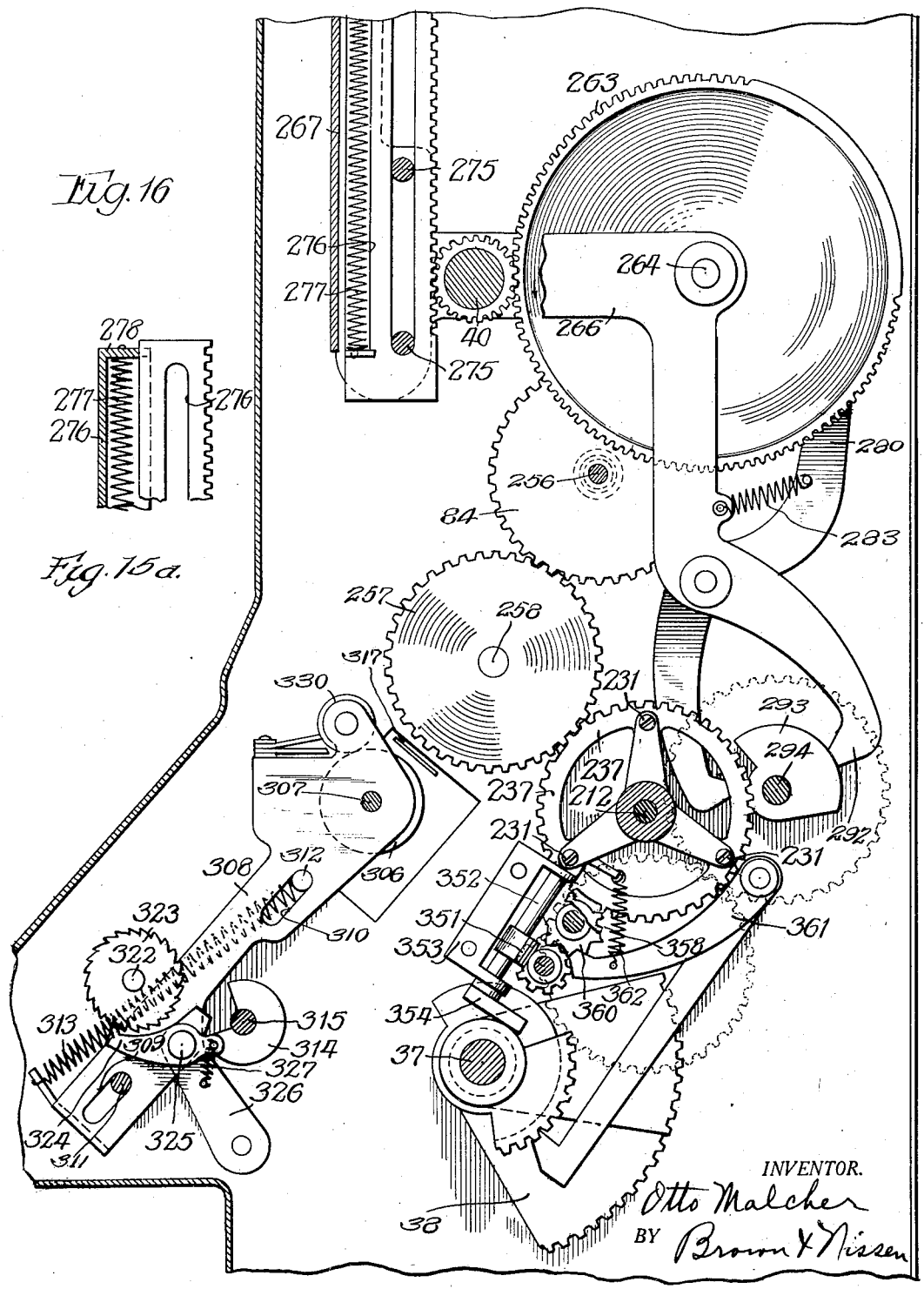

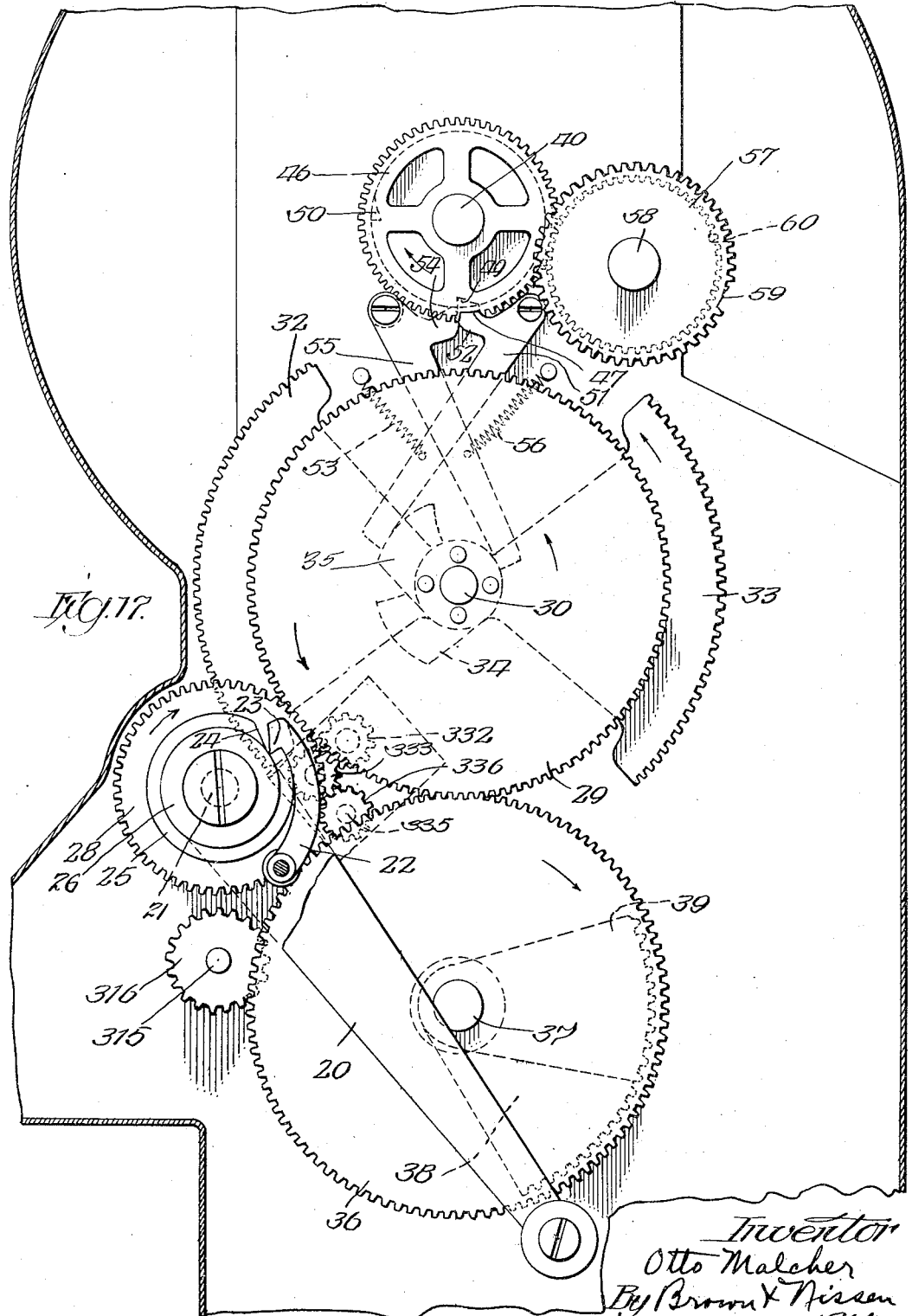

May 4, 1926. 1,582,999
O. MALCHER
COMPUTING MECHANISM FOR WEIGHING SCALES
Filed Dec. 15, 1919 16 Sheets-Sheet 16
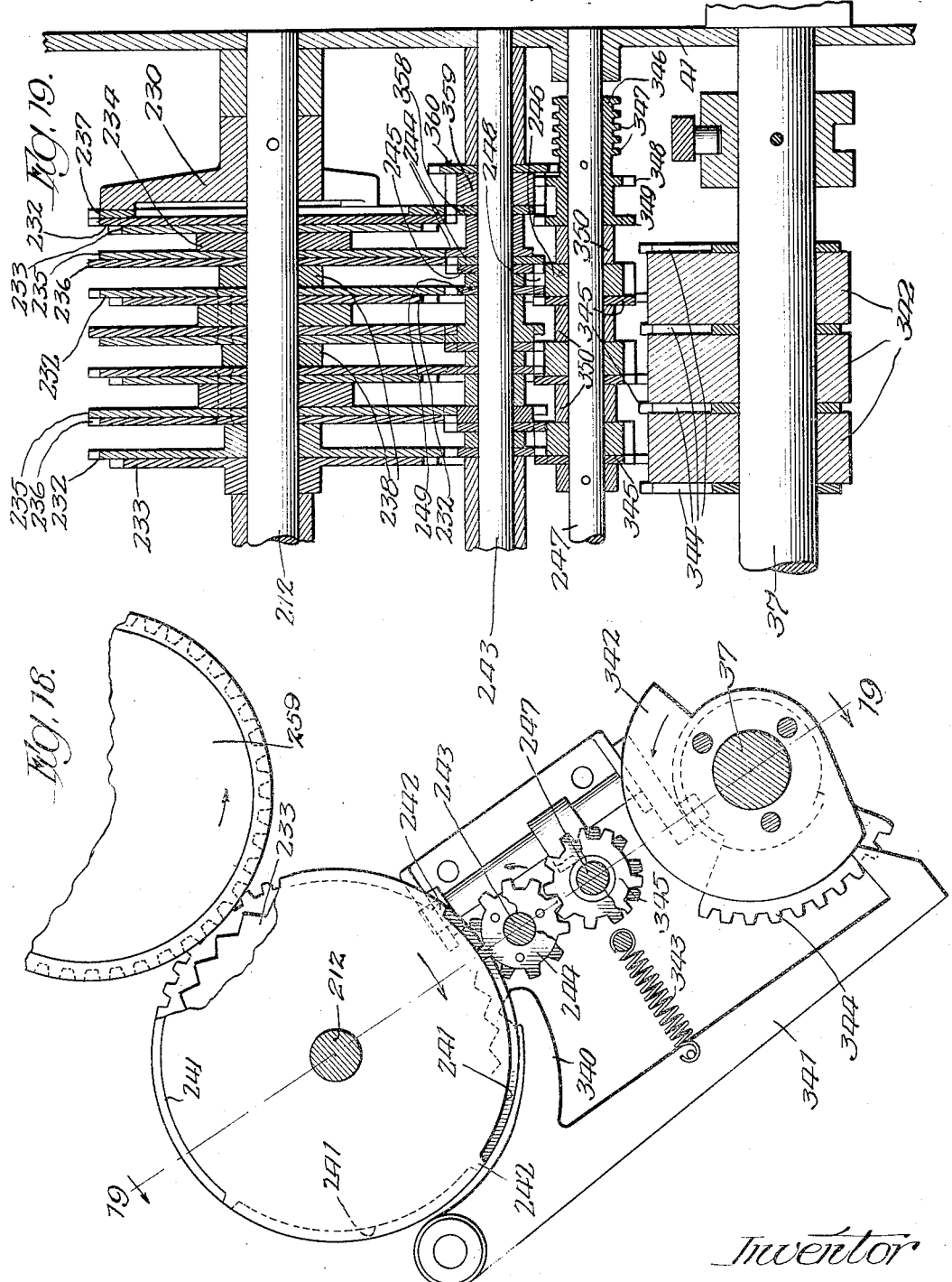

Patented May 4, 1926.

1,582,999

UNITED STATES PATENT OFFICE.

OTTO MALCHER, OF CHICAGO, ILLINOIS.

COMPUTING MECHANISM FOR WEIGHING SCALES.

Application filed December 15, 1919. Serial No. 345,116.

*To all whom it may concern:*

Be it known that I, OTTO MALCHER, a citizen of the United States, residing at Chicago, in the county of Cook and State of Illinois, have invented certain new and useful Improvements in Computing Mechanism for Weighing Scales, of which the following is a specification.

This invention has for its object the provision of a device of the character named which shall be of improved construction and operation.

The invention is exemplified in the combination and arrangement of parts shown in the accompanying drawings and described in the following specification, and it is more particularly pointed out in the appended claims.

In the drawings—

Fig. 1 is an elevation showing the operator's side of the portion of a scale casing which contains the computing mechanism comprising the present invention;

Fig. 2 shows the customer's side of the casing of Fig. 1;

Fig. 3 is an elevation of a portion of a section of one part of the mechanism of the present invention;

Figs. 4 and 5 are views similar to Fig. 3 showing other portions of the computing mechanism;

Fig. 6 is a horizontal sectional view substantially on line 6—6 of Figs. 4 and 5;

Fig. 7 is a vertical section taken on line 7—7 of Fig. 3 showing the price keys and associated mechanism;

Fig. 8 is a horizontal section taken on line 8—8 of Figs. 7 and 3 showing a detail of the mechanism of Fig. 7;

Fig. 9 is a vertical section substantially one line 9—9 of Fig. 4;

Fig. 14 is a vertical section substantially on line 14—14 of Fig. 5;

Fig. 15 is a vertical section substantially on line 15—15 of Fig. 5;

Fig. 15ᵃ is a fragmentary sectional view of a portion of the mechanism above that shown in Fig. 15;

Fig. 16 is a vertical sectional view substantially on line 16—16 of Fig. 5;

Fig. 17 is a vertical sectional view substantially on line 17—17 of Figs. 5 and 6;

Fig. 18 is a vertical sectional view taken on line 18—18 of Fig. 5 of the carrying and clearing mechanism shown in Fig. 5 for the counter;

Fig. 19 is a section substantially on line 19—19 of Fig. 18; and

Figure 10:
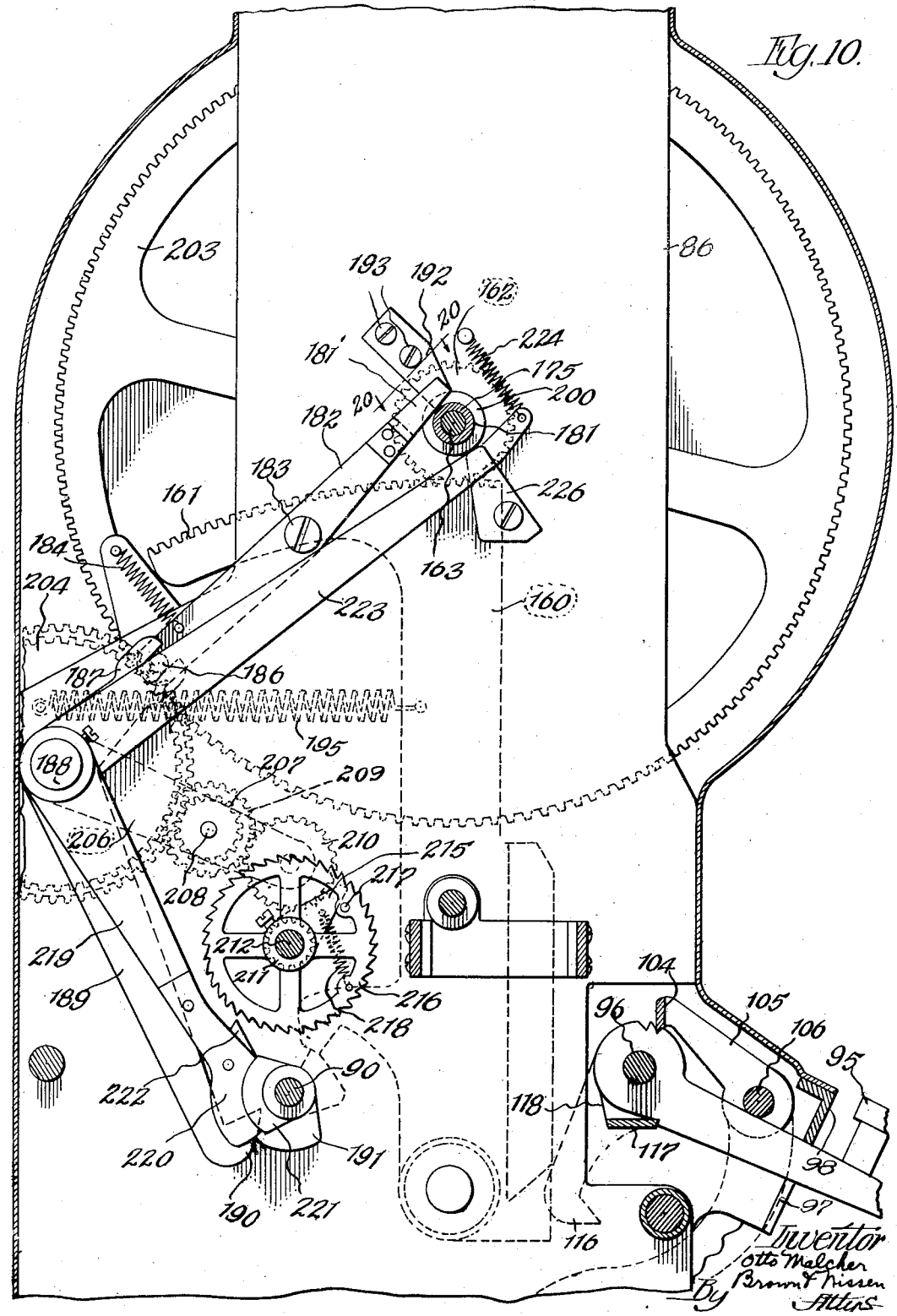
Fig. 10 is a vertical section substantially on line 10—10 of Fig. 4.

Fig. 20 is a fragmentary sectional view on line 20—20 of Fig. 10.

The computing mechanism is designed so that it may be used in connection with weighing scales of ordinary construction without interfering with the regular operation of the weighing scale and without adding any appreciable mechanism to be moved by the weight of the object upon the scale. An article to be weighed is placed upon the pan of the scale in the usual manner and the operator presses a key corresponding to the price at which the article is to be sold. Then upon rotation of the hand crank at one end of the scale frame a ticket is issued bearing the price per pound, and the total value. Other matters, such as the date, may be printed at the same time, if desired. The device not only issues the ticket, but it also exhibits to the customer and to others in the room the price, the weight, and the total amount of the sale. Furthermore, mechanism is provided by which the operator is enabled to furnish to the customer the proper quantity to amount to a given total value.

*Handle mechanism.*

The mechanism for performing the various operations of the device is driven primarily by a hand crank and associated parts, shown best in Figs. 5, 6 and 17. A hand crank 20 is mounted to rotate freely on a stud shaft 21 and carries a dog or pawl 22 having a hook portion 23 which is spring-pressed into engagement with a notch 24 in the periphery of a disc 25 on a collar 26 which rotates freely on the stud shaft 21. The handle 20 with the pawl 22 and the disc 25 shown in Fig. 6 are located outside of the casing plate 27, shown in Fig. 17. The collar 26 extends through the casing plate 27 and carries within the casing a spur gear 28 so that the gear 28 and disc 25 may be rotated in unison with one another in one direction only by the rotation of the handle 20. The gear 28 meshes with a spur gear 29 rotatively mounted on a stud shaft 30 and having a hub 31 connected therewith which carries gear segments 32 and 33 extending in opposite directions therefrom, and also a pair of cam members 34 and 35. The ratio of the gears 28 and 29 is "one or two" so that two complete turns of the handle 20 is necessary to impart a single revolution to the gear 29. A total cycle of operation requires a complete revolution of the gear 29, thus making it necessary for the operator to rotate the handle 20 two complete revolutions for a computing operation. This prevents the operator from driving the mechanism at too rapid a speed for its proper operation.

A second gear wheel 36 is rigidly mounted on a shaft 37 and is the same size as the gear wheel 29. The shaft 37 has secured thereto in the casing plate 27 a pair of gear segments 38 and 39 for a purpose to be described.

A shaft 40 is journaled in parallel frame plates 41, 42, 43 and 44 of the device, as shown in Figs. 4 and 5, and a gear 46 is rigidly secured to the end of the shaft 40 in position to mesh with the gear segment 33 during the rotation of the gear wheel 29. A portion of the teeth of the gear 46 is cut away, as shown at 47, to permit the teeth of the segment 33 to come into mesh with the teeth of the gear 46 without danger of binding. Extending inwardly from the face of the gear 46 is a rim 48, shown in Fig. 5, the rim being provided with notches 49 and 50, shown in broken lines in Fig. 17. A dog 51 carries a tooth 52 which engages the notch 49 of the rim 48 when the mechanism is at rest. A spring 53 holds the tooth 52 in resilient engagement with the notch 49 and the cam 35 on the shaft 30 insures positive engagement with the tooth and notch at the beginning of the rotation of the handle 20 and until the cam 35 has moved a sufficient distance to free the end of the dog 51. This will occur slightly before the segment 33 engages the teeth of the gear 46 and the spring 53 will retain the tooth and notch in proper engagement until the gear 46 begins to be driven by the segment 33. The spring 53 will then permit the tooth 52 to ride out of the notch 49 as the gear 46 rotates. The segment 33 imparts approximately three-quarters of a revolution to the gear 46 bringing the notch 50 in position to engage a tooth 54 on a second dog 55 which registers with the cam 34 on the shaft 30 and is controlled by a spring 56. The spring 56 draws the tooth 54 into the notch 50, after which the cam 34 engages the dog 55 and positively holds the gear 46 from further rotation. The gear 46 and shaft 40 then remain stationary for a period of time, after which the gear segment 32 engages the teeth on an idler gear 57 mounted on a stud shaft 58. The idler gear 57 has a portion of its teeth cut away at 59 to permit the rack 32 to properly come into mesh with the teeth of the gear. The gear 57 has a second set of teeth, shown in broken lines at 60 in Fig. 17, and also shown in Fig. 6 which mesh with the teeth on the gear 46 so that during the three-quarter turn of the gear 46 driven by the segment 33 the opening 59 will be brought into proper position to facilitate the entrance of the segment 32 into mesh with the teeth of gear 57. Before the segment 32 begins to rotate the gear 57 the dog 55 will be released from the cam 34 so that when the gear 57 begins to turn it will drive the gear 46 in a reverse direction from that in which it is previously turned and the tooth 54 will be free to ride out of the notch 50. The segment 32 will impart approximately three-quarter of a turn to the gears 57 and 46 so that the gear 46 will be brought back to its initial position and the tooth 52 will be drawn into engagement with the notch 49 by the spring 53 after which the cam 35 will engage the dog 51 and lock the tooth in the notch. After the gear 46 has come to rest there will still be a portion of a rotation of the gear 29 before it completes its revolution.

It will thus be seen that two complete turns of the handle 20 will impart one complete rotation to the gear 29 and the segments 32 and 33. During this time there will be first a short period in which the shaft 40 will be at rest, followed by approximately three-quarters of a revolution of the gear 46 in a clockwise direction, followed by a period of rest, and then a three-quarter revolution of the gear 46 in a counterclockwise direction to return it to its initial position, after which there is another period of rest before the revolution of the gear 29 is completed.

*Scale disc and clamp.*

Prior to the rotation of the handle, the article to be weighed is placed upon the scale pan, which may be balanced by springs or weights in any well-known manner, so that it produces a movement proportional to the weight of the article upon the scale pan. In Fig. 3 a pair of racks 61 are shown which are connected with the scale pan, not shown, so that the racks 61 move a distance proportional to the weight of the article upon the pan. The racks 61 mesh with pinions 62 secured to a shaft 63 journaled in vertical frame plates 65 and 66, as shown in Fig. 3. The shaft 63 carries a scale drum 67 provided with two sets of numerals 68 and 69 representing pounds and fractions thereof of the article being weighed. It will be evident that the scale drum 67 will move a distance proportional to the weight of the article and the casing is provided with an opening 70 on the operator's side through which the numeral 68 may be read to indicate the weight to the operator, and a similar opening 71 is provided to permit the customer to see the figures 69 so that both the operator and customer may see the weight of the article upon the scale pan. The shaft 63 carries a disc wheel 72 for controlling the operation of the computing mechanism. The disc 72 is entirely free from the computing mechanism during the weighing operation so that the disc itself constitutes the only additional part which must be moved by the weight on the scale pan, and this is free to oscillate back and forth until the scale pan comes to rest.

When the scale pan has come to rest and the operator begins to turn the crank 20 the disc 72 will be clamped between a pair of jaws 73 which may be provided with pads of cork or other material 74 for engaging the faces of the disc 72. The jaws 73 are carried by sleeve 75 and 76 which are splined on a shaft 77 and which carry peripheral rack teeth 78 arranged to mesh with the teeth of a pair of pinions 80 and 81 rigidly secured to shafts 82 and 83, respectively. The shafts 82 and 83, as shown in Fig. 4, are provided with intermeshing segments 84 to insure rotation of the pinions 80 and 81 in unison with one another. The shafts 82 and 83 are journaled in bars 85 carried by the frame plates 65 and 86.

Figure 13:
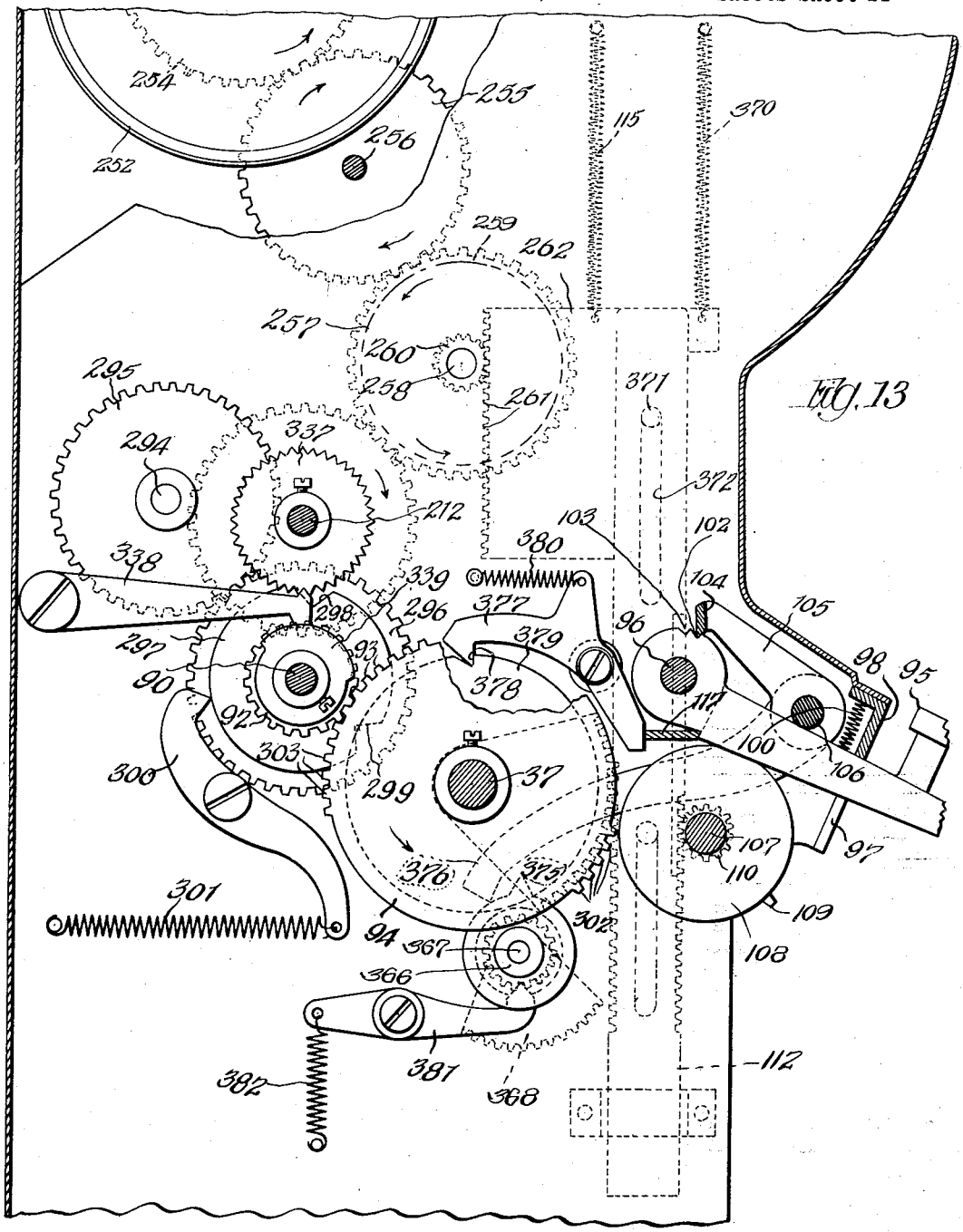
Fig. 13 is a vertical section substantially on line 13—13 of Fig. 5.

An operating arm 87 is secured to one end of the shaft 82 and is provided with a cam roller 88 which bears against a face of a cam 89 secured to a cam shaft 90. The end of the arm 87 is provided with a coil spring 91, as shown in Fig. 4, which normally presses the roller 88 against the face of the cam 89 and which when released by the cam 89 rotates the shafts 82 and 83 in a direction to shift the cylindrical racks 78 toward one another to bring the jaws 73 into clamping engagement with the opposite sides of the scale disc 72. The cam shaft 90, as shown in Figs. 5 and 13, is provided with a spur gear 92 which meshes with teeth 93 on a mutilated gear 94 secured to the shaft 37. At the beginning of the rotation of the handle 20 a portion of the teeth 93 will impart a partial rotation to the gear 92 and cam shaft 90 so that the cam 89 will be rotated in a counterclockwise direction, as viewed in Fig. 9, to free the cam roller 88 and permit the spring 91 to move the arm 87 and bring the jaws 73 into clamping engagement with the disc 72. In this way the disc 72 is positively clamped against rotation at the beginning of the movement of the hand crank 20 and after it has been rotated an amount proportional to the weight of the article upon the scale pan.

*Price keys.*

The compound value depends upon two factors, the weight of the article, and the price per unit pound. The computing mechanism is controlled by the scale disc 72 in order to make the compound value proportional to the weight and it is controlled by a series of price keys in order that the value may be proportional to the price per unit weight. These price keys are shown at 95 in Figs. 1, 3, 7, 9, 10, 11 and 13. The keys 95 are pivoted on a shaft 96 extending longitudinally of the computing device and are arranged to move up and down in slots 97 formed in a plate 98. Each key 95 is provided with an offset ear 99 and a coil spring 100 which normally raises the key to its extreme uppermost position. A pair of notches 102 and 103 is formed in each of the keys 95 and a universal detent bar 104 is carried by arms 105 pivotally mounted on a shaft 106 in position to engage the notches 102 and 103. When a key 95 is depressed the detent bar 104 will engage the notch 103 of that key and retain it in its lower position. If a second key is depressed the bar 104 will be raised and the key previously depressed will be released.

Extending parallel to the shaft 96 is a shaft 107 which carries a plurality of one-toothed gears 108 fixed thereon. The teeth 109 of the gears 108 are arranged in step relation to one another so that they lie in a helix arranged about the periphery of the cylinder formed by the outer portions of the gears. There is one gear 108 for each of the keys 95 and the gears are so arranged that when a key 95 is depressed the ear 99 on that particular key will extend into the path of movement of the tooth 109 on the corresponding gear 108.

As shown in Fig. 14, the end of the shaft 107 is provided with a pinion 110 which meshes with rack teeth 111 on a bar 112 slidably held in place against the face of the frame plate 42 by a clip 113 and a pin 114. A coil spring 115 normally tends to raise the bar 112 and to rotate the pinion 110 and the shaft 107 in a counterclockwise direction, as viewed in Figs. 13 and 14. The shaft 107 is held against rotation under the influence of the spring 115 by a detent 116 pivotally mounted on the shaft 96 and connected with a universal bar 117 also pivotally carried on the shaft 96 by ears 118. The detent 116 engages a notch 119 in a disc 120 rigidly connected with the shaft 107. When a key 95 is depressed the universal bar 117 will be swung to the right, as viewed in Fig. 7, by means of a notch 121 on the key 95 and the detent 116 will be raised out of the notch 119 to release the shaft 107 and permit it to rotate under the influence of the spring 115. The notch 119 is made deep enough so that the shaft 107 will not be released until the ear 99 on the key 95 is brought into the path of movement of the tooth 109 on the particular disc 108 corresponding to the key depressed. The shaft 107 will be rotated by the spring 115 until the tooth 109 engages the ear 99. In this way the shaft is made to rotate an amount corresponding to the particular price represented by the key depressed.

Figure 11:
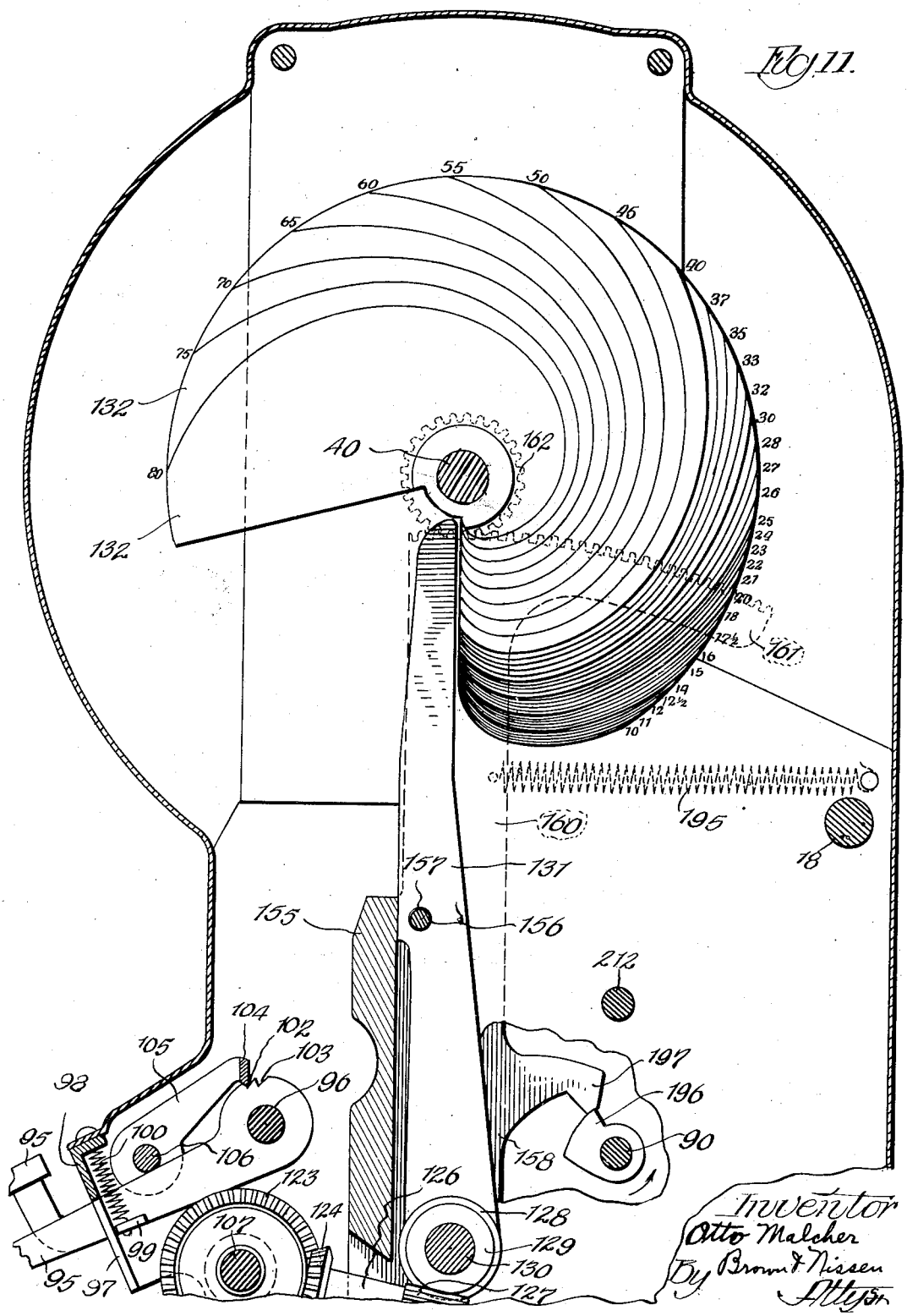
Fig. 11 is a vertical section substantially on line 11—11 of Fig. 4.
Figure 12:
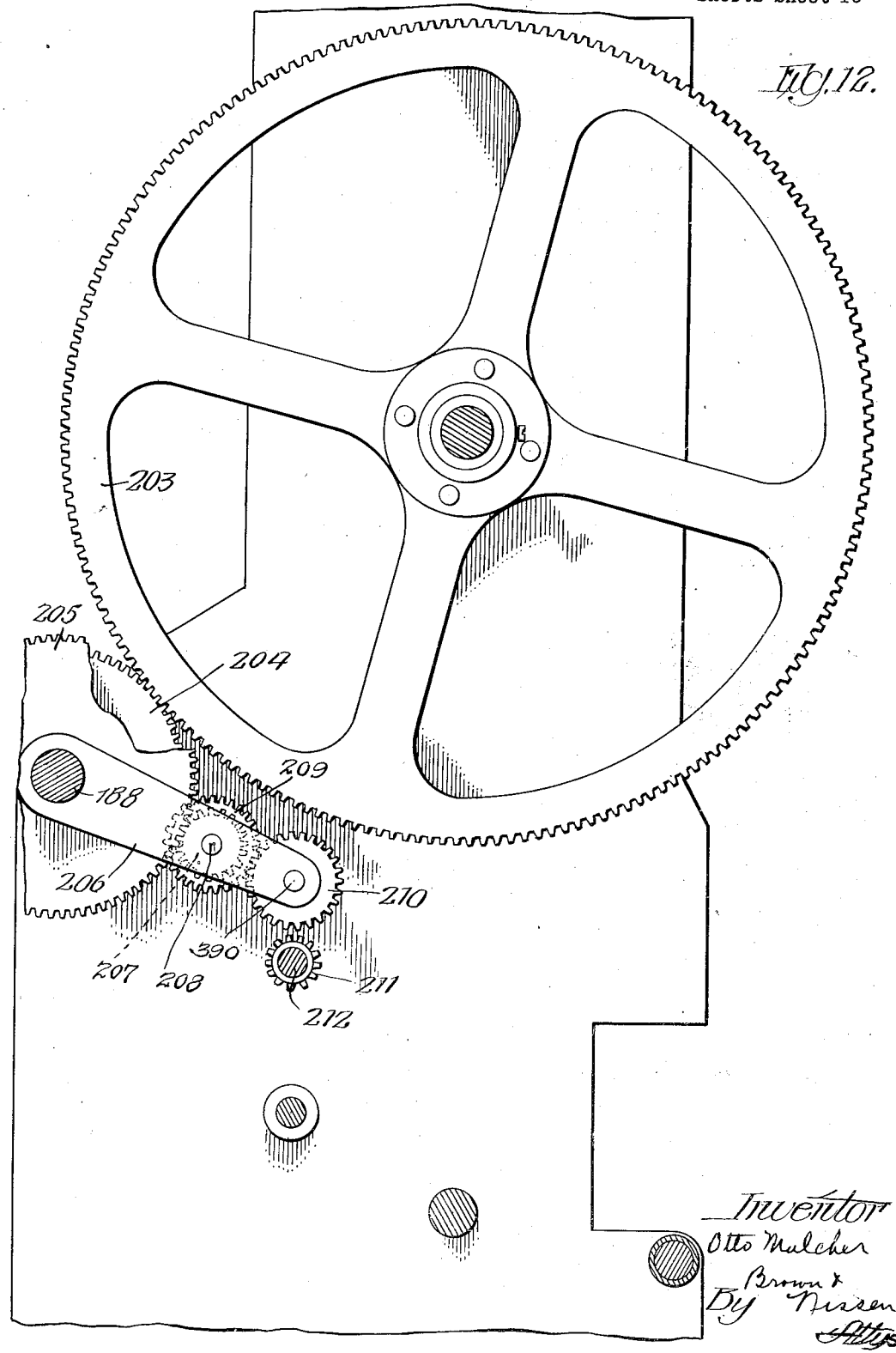
Fig. 12 is a vertical section substantially on line 12—12 of Fig. 4.

The shaft 107 carries a beveled gear 123 shown in Figs. 6 and 11, which meshes with a beveled gear 124 mounted on a shaft 125, shown in Figs. 4 and 6, journaled in a bearing 126. The end of the shaft opposite the pinion 124 carries a spur pinion 127 which meshes with teeth 128 of a sleeve or circular disc 129 slidably mounted on a shaft 130. Rotation of the shaft 107 will impart a corresponding rotation to the shaft 125 and pinion 127 so that the sleeve 129 will be longitudinally slid along the shaft 130. The sleeve 129 has an arm 131 secured to one end thereof and arranged to bear upon a series of price cams 132 which are secured to the shaft 40. There is one cam 132 corresponding to each of the prices at which the scale is arranged to compute values, and when one of the keys 95 is depressed the arm 131 is moved along the shaft 130 until it is brought to a position opposite the cam 132 corresponding to the price represented by the key depressed.

*Mechanism for determining a quantity having a given value.*

It frequently happens that a customer instead of buying by the pound prefers to buy a quantity which shall have a given value, as for example, ten cents' worth, or twenty-five cents' worth, as the case may be. Quantities in this way are usually less than a pound and the invention as illustrated in the drawings is shown as provided with mechanism for selling goods in this way up to one pound. The same principle may be extended to include larger amounts however. As shown in Fig. 3, the shaft 107 is provided adjacent the end wall 133 with a beveled pinion 134 which meshes with a pinion 135 carried on a shaft 136. The shaft 136 is journaled in brackets 137 on the frame wall 133 and is provided with a beveled pinion 138 at its upper end. The pinion 138 meshes with a pinion 139 on a shaft 140 which is journaled in the frame plates 66 and 133 and which is in alinement with the scale shaft 63, but separate therefrom. The shaft 140 is provided with a price drum 141 connected with a sleeve 142 which is splined on the shaft 140 so that the drum 141 rotates with the shaft 140, but is free to slide longitudinally thereon. The sleeve 142 is provided with circumferential rack teeth 143 which mesh with the teeth of a segment 144 carried by a shaft 145 journaled in brackets 146. A pair of fingers 147 and 148, Figs. 3 and 8, are secured to the lower end of the shaft 145 in position to engage a pin 149 carried on a bracket 150 connected with the price drum 141. When the shaft 107 is rotated the price drum 141 is moved a corresponding amount to bring the numbers on its periphery opposite an opening 151 in the casing of the device. The price cam 132 corresponding to the highest price for which the scale is arranged to form computations is located at the right-hand side of the series, as shown in Fig. 4, so that the smallest amount of movement is necessary to bring the arm 131 into position opposite the cam corresponding to the highest price, and the amount of movement necessary to bring the arm into position opposite the other cams increases as the price to which the cams correspond decreases. The numbers on the price drum 141 are correspondingly arranged so that a small amount of movement will bring the highest price shown in the drawing as eightly cents per pound opposite the opening in the casing. Further movement will bring other price numbers opposite the opening corresponding to the particular price drum opposite which the arm 131 is located by the rotation of the shaft 107.

As will be explained, it is desirable to have the amount of movement of the price drum 141 for each price indicated on the drum equal to the movement of the scale drum 67 for each pound weight. The scale shown in the drawings is designed for a maximum weight of twenty-four pounds so that there are but twenty-four divisions on the drum 141. There are, however, more than twenty-four different prices at which it is desired to perform computations. For this reason two sets of figures are provided on the drum 141 and provision is made for shifting the drum longitudinally at the proper time to change from one column of figures to the other in order to provide a greater range of prices to be exhibited through the opening in the casing. It will be understood from Fig. 8 that when the drum 141 has made one complete revolution the pin 149 will return to its original position and in doing so will strike the finger 147 and impart a partial rotation to the shaft 145. This rotation of the shaft 145 will slide the drum 141 along the shaft 140 by means of the segment 144 and the circular rack teeth 143. This sliding movement will shift the drum 141 into the position shown in broken lines in Fig. 8 and bring a different column of figures on the face of the drum into position to register with the opening in the casing of the device.

The drum may then continue its rotation and disclose a new set of figures through the opening in the casing. When the drum is rotated to its original position the pin 149 will strike the finger 148 and restore the drum to its original position upon the shaft 140.

The price drum 141 not only provides means for exhibiting the price at which a computation is being made, but also enables the operator to furnish the customer with an amount of a given value at the price so indicated. As shown in the drawings, the space corresponding to the different prices on the drum 141 is graduated with a number of divisions represented by the price. For example, the space corresponding to seventeen and one-half cents per pound is divided into seventeen and one-half equal divisions. Now when the mechanism is set to compute values at seventeen and one-half cents per pound, the seventeen and one-half cents space is brought opposite the opening in the casing, which opening, as shown in Fig. 1, is adjacent the opening for the scale drum 67. It is apparent that a movement of the scale drum equal to one of the divisions in the price drum corresponds to one cent's worth of the commodity upon the scale pan, and in order to ascertain fifteen cents' worth, for example, it is only necessary to place enough of the commodity on the scale pan to cause the zero reading on the scale drum to come opposite the fifteenth graduation on the price drum. Amounts corresponding to other values may be ascertained in the same way.

*Price cams and register control.*

It will be seen from Fig. 11 that the cams 132 all begin to diverge from the shaft 40 along a common axis of the shaft and that the rapidity of the outward divergence of the cams is greater for the lower prices and less for higher prices. The maximum diameter of the highest price cam is reached at approximately 270 degrees from the initial position. This arrangement permits of movement of the arm 131 along the shaft 40 into position opposite any particular cam 132 prior to rotation of the shaft 40. When the shaft 40 begins to rotate driven by the gear 46, as previously explained, the particular cam opposite which the arm 131 is placed will engage the arm and swing it to the left, as viewed in Fig. 11. If the arm is opposite a cam corresponding to a high price the movement will be relatively slow, but if the cam represents a lower price the movement will be correspondingly more rapid. The arm 131 for all its positions along the shaft 130 is arranged to bear against the face of a plate 155 and is held in place by a rod 156 which passes through an opening 157. The plate 155 is provided with flanges 158 and 159 which are journaled upon the shaft 130. The flange 158 is continued upwardly, as shown in Figs. 4 and 11, to form an arm 160 which carries a gear segment 161 at its upper end. The gear segment 161 meshes with the teeth of a spur gear 162 secured to a shaft 163 in line with the shafts 40 and 63, but independent thereof. The shaft 163, as shown in Figs. 3, 4 and 9, is provided with a bracket plate 164 rigidly connected to the end thereof and carrying a pivot pin 165 at a point removed from the axis of the shaft 163. An arm 166 is pivotally mounted on the pin 165 and a gear segment 167 is rigidly connected to the arm 166 by a brace member 168 which is secured to the pivotally mounted gear 167. The gear segment 167 is provided with gear teeth 169 on the lateral face thereof in position to mesh with teeth on a pinion 170 secured to a shaft 171 mounted in bearings 172 on the bracket plate 164. The shaft 171 carries a mutilated pinion 173 which engages circular teeth on a sleeve 175 mounted to slide on the shaft 163. A coil spring 176 normally tends to slide the sleeve 175 to the right, as viewed in Figs. 3 and 4.

The arm 166 is provided at its outer end with a sliding contact member 177 which is adjustably held in place by screws 178. The scale disc 72 is provided with a pin 179 adjacent the end of the contact piece 177 when the scale disc 72 is in zero position. When the scale disc 72 has been rotated by a weight upon the scale pan the pin 179 will be moved away from the end of the contact piece 177 so that the arm 166 may be swung about the pin 165 to bring the contact surface 180 on the arm 166 into the path of the pin 179. It will be apparent that since the pin 165 is spaced from the center of the disc 72 that rotation of the arm 166 about the pin 165 will move the end of the arm toward the periphery of the disc 72 to cause the contact portion 180 of the arm 166 to swing into the path of the pin 179. Prior to such movement, however, the end of the arm 166 is inside the path of the pin 179 so that the disc 72 is free to oscillate under the influence of the weight upon the scale pan back and forth past the zero point without engagement of the pin 179 and the arm 166.

The spring 176 normally tends to slide the circular rack 175 to the right, as viewed in Fig. 3, or away from the plane of the paper, as viewed in Fig. 9. During the weighing operation the spring 176 is held in its compressed condition by mechanism to be described, but after the weighing is completed the holding mechanism for the rack 175 is released and the rack is moved under the influence of the spring 176. This will rotate the mutilated pinion 173 and the shaft 171 and swing the gear segment 167 and the arm 166 in a clockwise direction, as viewed in Fig. 9, bringing the contact portion of the arm 166 into the path of the pin 179. In order to prevent this movement of the arm 166 prior to the completion of the weighing operation the sleeve 175 is provided with a circumferential groove 181 which is engaged by an offset plate 181' on one end of a lever 182 pivotally mounted at 183 on the frame plate 86, Figs. 10 and 20. So long as the plate 181' rests in the groove 181 the sleeve 175 is held against sliding movement on the shaft 163. A spring 184 normally presses the plate 181' on the end of the lever 182, into the groove 181, as shown in Fig. 10, and the opposite end of the lever 182 is provided with a pin 186 engaged by the bifurcated end of an arm 187 rigidly carried on the end of a shaft 188 which is journaled in the frame members 43 and 86. The arm 187 is formed integrally with a downwardly extending arm 189 provided with a hooked end 190 arranged to cooperate with a cam 191 on the cam shaft 90. At the beginning of the rotation of the hand lever 20 and immediately after the scale disc 72 has been clamped by the jaws 73 the cam 191 rocks the bell crank lever comprising the arms 187 and 189 and so lifts plate 181' on the end of the lever 182 out of the groove 181 and permits the sleeve 175 to move under the influence of the spring 176 and so swings the arm 166 into operative position to engage the pin 179 in a manner to be described. A reinforcing bracket 192 is secured to the face of the frame members 86 by screws 193 and engages the lateral face of the lever 182 to prevent the lever from springing under the influence of the spring 176.

The setting of the clamp 73 and the contact arm 166 takes place during the initial movement of the cam shaft 90 prior to the rotation of the gear 46 and the shaft 40. Also, during this time the arm 131 is drawn into contact with the particular cam 132 opposite which it has been set by the depression of a price key 95. A spring 195 is connected with the arm 160 and normally tends to draw it to the right, as viewed in Fig. 11, in order to cause the plate 155 to resiliently press the end of the arm 131 into engagement with the periphery of the cam with which it is cooperating. During the time that the arm 131 is being set by the price keys the arm 160 is prevented from movement under the influence of the spring 195 by a cam 196 on the cam shaft 90 which engages a projection 197 on the arm 160. During the initial rotation of the cam shaft 90 the projection 197 is released and the spring 195 draws the arm 131 into engagement with the face of the cam opposite which it is set.

When the shaft 40 begins to rotate driven by the gear 46 and the segment 33 the particular cam with which the arm 131 is in contact will swing the arm to the left, as viewed in Fig. 11. This movement will carry with it the gear segment 161 which will rotate the gear 162 which carries with it the plate 164 and the contact arm 166. The rapidity with which the arm 131 and the segment 161 are moved and consequently the speed of rotation of the gear 162 and the contact arm 166 will depend upon the price cam with which the arm 131 engages. If a price cam corresponding to a low value is employed the rotation of the contact arm 166 will be comparatively rapid, and it will be brought into engagement with the pin 179 more quickly than will be the case if a cam corresponding to a higher price is employed. When the contact arm 166 has been brought into engagement with the pin 179 further rotation of the arm will be checked, but the shaft 163 will continue to rotate under the influence of the segment 161. This will cause the gear segment 167 to be held back while the plate 164 which carries the pinion 170 continues to move. Thus the shaft 171 will be rotated and the sleeve 175 will be moved along the shaft 163 compressing the spring 176. This will retract the end of the contact arm 166 until it will pass within the pin 179 and permit the plate 164 and the shaft 163 to continue to rotate. The sleeve 175 will be locked in its retracted position when the spring 176 has thus been compressed by mechanism which will now be described.

The end of the sleeve 175 is provided with a circular bearing portion 200 at the right of the notch 181, as viewed in Fig. 4 and at the left of the notch as shown in Fig. 20, and the lever 182 is bifurcated at its end, as shown in Fig. 20, so that when the end thereof engages the notch 181, the plate 181' will lie adjacent the end portion 200 of the sleeve 175. When the lever 182 is raised out of contact with the sleeve 175, as previously explained, and the sleeve is slid along the shaft 163 under the influence of the spring 176, the bearing portion 200 will be brought beneath the end of the lever 182 and the lever will thus be held against the tension of the spring 185 independently of the cam 191. Prior to the rotation of the shaft 40 the cam 191 will have moved past the contact portion 190 so that the lever 182 will no longer be held by the bell crank 187, but will be retained in its retracted position by the contact portion 200 of the sleeve 175. As soon therefore as the sleeve 175 is restored to its initial position by contact between the arm 166 and the pin 179, the part 200 will be withdrawn from beneath the end of lever 182 and the plate 181' will be snapped back into engagement with the notch 181 in the sleeve 175 by the spring 184 and the sleeve will be again locked in its retracted position.

The shaft 40 has rigidly mounted thereon a spur gear 203 which rotates in unison with the shaft 40 and the price cams 132. The gear 203 meshes with a smaller gear 204 rotatably mounted on the shaft 188, as shown in Figs. 4, 6, 10 and 12. The gear 204 is secured to a second gear 205 which is coaxial therewith, but offset laterally a slight distance from the plane of the gears 203 and 204, as shown in Figs. 4 and 6. The shaft 188 has an arm 206 fixed thereon and a pinion 207 is rotatably mounted on a stud shaft 208 carried on the arm 206. The pinion 207 has rigidly connected thereto a pinion 209 of slightly larger diameter which meshes with a pinion 210 rotatably mounted on a pivot 390 near the end of the arm 206. The arm 206 is oscillated about the shaft 188 as an axis when the bell crank comprising the parts 187 and 189 is moved in the manner previously described. It will be apparent that the pinion 210 at the end of the arm 206 is connected with the large gear 203 to be driven thereby independently of the angular position of the arm 206 about its axis 188. The movement of the arm 206 shifts the pinion 210 into and out of mesh with a pinion 211 carried by a shaft 212 which extends longitudinally of the frame of the device and is journaled in frame plates 41, 42, 43, 44 and 86, as shown in Figs. 4 and 5. The shaft 212 operates the counting mechanism, to be described, and shown at the right of Fig. 5. It will be seen from Fig. 10 that when the arm 189 is operated by the cam 191 to raise the lever 182 out of the notch 181 the arm 206 will at the same time be swung downwardly to bring the pinion 210 into mesh with the pinion 211 on the shaft 212. Thus at the same time that the arm 166 is shifted into the path of the pin 179 on the scale disc 72 the gear train is completed between the gear wheel 203 and the counter shaft 212. As soon therefore as the shaft 40 begins to rotate the gear 203 will begin to drive the counter and this driving operation will continue until the arm 166 strikes the pin 179 and shifts the sleeve 175. When this occurs the end of the arm 182 will slide off of the end of the contact ring 200, as previously explained, and the gear 210 will then be immediately withdrawn from engagement from the gear 211 and the driving connection between the gear 203 and the counter shaft 212 will be broken. The time that the counter shaft is thus being driven will depend upon the space that the arm 166 has to travel, which is controlled by the weight upon the scale pan, and will also depend upon the speed at which the arm 166 travels, which is controlled by the particular price cam engaged by the arm 131. If a price cam representing a low value is being used the arm 131 will be moved quickly toward the periphery of the cam which will impart a rapid movement of the arm 166 as compared with the rotation of the gear 203, so that the arm 166 will be brought into contact with the pin 179 more quickly than is the case where a cam representing a high price is used. Where a high price cam is employed the arms 131 and 166 will move more slowly compared with the movement of the gear 203, so that the gear 203 will drive the counting mechanism a larger amount before it is disconnected therefrom by engagement between the arm 166 and pin 179. In this way the amount that the counter is driven is made to depend upon the two factors of the value to be computed, namely, the weight of the article upon the scale pan and the price per unit pound. It is therefore merely a matter of properly shaping and proportioning the price cams 132 in order to cause the counting mechanism to register the product of the two factors entering into the value of the article upon the scale pan. The shape of the various price cams may be laid out originally, either by trial or by computation, and the cams of subsequent devices will, of course, be patterned after the cams thus originally designed.

It will be apparent that simply moving the gears 210 and 211 into and out of mesh at the beginning and end of a computing operation may not be sufficiently accurate to insure exact results in every case. Mechanism is therefore provided for positively stopping the rotation of the shaft 212 at the time that the sleeve 175 is shifted by contact between the arm 166 and pin 179. At the time that the gears 210 and 211 are moved into mesh the parts thus connected are rigidly held in proper position so that there can be no inaccuracy arising at this time.

Rigidly fixed on the end of the shaft 212, adjacent the frame plate 86, as shown in Figs. 6 and 10, is a stop arm 215, and a ratchet wheel 216 is rotatably mounted on the shaft 212 adjacent the arm 215. The ratchet wheel 216 is provided with a stop pin 217 which is resiliently held in engagement with the stop arm 215 by a coil spring 218. A bell crank lever having a downwardly extending arm 219 is pivotally mounted on the shaft 188 and is provided with a bearing member 220 which engages a cam 221 secured to the cam shaft 90. The arm 219 also carries a detent tooth 222 in position to engage the teeth on the ratchet wheel 216. The other arm 223 of this bell crank lever is offset, as shown in Fig. 4, into the plane of the lever 182 so that the end of the arm 223 may be resiliently drawn by a spring 224 into engagement with the periphery of the contact portion 200 of the sleeve 175. A plate 226 is secured to the frame plate 86 and bears against the face of the lever 223 to hold it against lateral movement. At the beginning of the rotation of the cam shaft 90 the bell crank comprising the arms 219 and 223 is held in the position shown in Fig. 10, so that it does not interfere with the sliding movement of the sleeve 175 by which the arm 166 is shifted into its operative position, as previously explained. Before rotation of the shaft 40 begins however the cam 221 is moved out of engagement with the contact member 220 so that the arm 223 is drawn by the spring 224 into engagement with the periphery of the contact portion 200 of the sleeve 175. When the arm 166 strikes the pin 179 on the scale disc and the sleeve 175 is returned to its initial position the arm 223 is freed from the contact ring 200 and moves inwardly toward the shaft 163 under the influence of the spring 224. This movement of the bell crank lever brings the detent tooth 222 immediately into engagement with a ratchet tooth on the wheel 216 and stops the rotation of the ratchet wheel. The same sliding movement of the sleeve 175 frees the arm 182 and causes the pinion 210 to be withdrawn from engagement from the pinion 211, as previously explained. The parts are preferably so proportioned that the tooth 222 engages the ratchet wheel 216 slightly in advance of the disengagement between the gears 210 and 211. The shaft 212 will then be rotated a slight distance after the ratchet wheel 216 has been brought to rest. This additional rotation of the shaft 212 is permitted by the yielding connection 218 between the ratchet wheel and shaft. After the gears 210 and 211 have been moved out of mesh the spring 218 will return the shaft 212 to the position it occupied when the movement of the ratchet wheel was stopped, which position will be determined by contact between the stop pin 217 and the stop arm 215. In this way the control of the movement of the shaft 212 is made to depend upon the ratchet wheel 216 rather than upon the shifting of gears. This produces a positive and accurate control and one which can be regulated, as experience has shown, to accuracy within the limits of a one cent value for prices of commodities within the limits of the computing mechanism.

*Value register.*

The counter or value registering mechanism driven by shaft 212 will best be understood by reference to Figs. 5, 15, 16, 18 and 19. The shaft 212 carries a spider 230 fixed thereon which is secured by screws 231 to the various parts of the units portion of the counting mechanism. These parts comprise a forty-toothed gear 232, a forty-toothed star wheel 233, a spacing washer 234, and a pair of carrying discs 235 and 236. The units section of the computing mechanism also includes a gear 237 which lies against the face of the gear 232 and which is of the same pitch as the gear 232, but has every tenth tooth cut away, as shown in Fig. 16. The parts of the units section of the counter are all rigidly secured together and fixed to the shaft 212. Other sections of the counter corresponding to different decimal orders are provided which have forty-toothed wheels, star wheels and carrying wheels corresponding to those of the units section. The sections of the higher decimals are, however, free to rotate upon the shaft 212 and are separated from one another by washers, as shown at 238. The counter section in the highest decimal order is provided only with a forty-toothed wheel 232 and a star wheel 233, as shown in Fig. 19. The parts of the machine are so proportioned that a rotation corresponding to one tooth of the forty-toothed wheel 232 in the units order represents a computed value of one cent and the gear 232 is arranged to mesh with a numeral wheel 239 provided with four sets of numerals 240, ranging from "zero to 9". It will be apparent that a complete rotation of the forty-toothed wheel 232 represents a value of forty cents and arrangement must therefore be made to carry four times into the ten's column for each rotation of the wheel 232. The carrying discs 235 and 236 have sections cut away, as shown at 241 in Fig. 18, the two discs being so disposed relative to one another that the portions not cut away lap over, as shown at 242, an amount corresponding to the width of one tooth of a set of carrying pinions mounted on a shaft 243 parallel with the shaft 212. Each complete carrying pinion comprises two mutilated pinions 244, each having alternate teeth removed, as shown in Fig. 18, and arranged relative to one another so that the remaining teeth of each pinion alternates with the teeth of the companion pinion. It will be apparent from Fig. 18 that when a tooth on one of the pinions 244 engages a cut-away portion 241 the shaft 243 will be locked against rotation by two teeth on the companion pinion. When, however, the carrying discs 235 and 236 have been rotated to bring their overlapping portions 242 into mesh with the carrying pinions 244, the pinions 244 will be rotated an amount corresponding to one tooth and will be again locked from rotation. Thus for each complete revolution of the carrying discs 235 and 236 the carrying pinions 244 will be moved four spaces and will carry four digits to the next higher decimal order. To transfer the carrying movement to the next higher decimal order a full pinion 245 is fixed to the mutilated pinions 244 to rotate in unison therewith and this pinion drives a transfer pinion 246 rotatably mounted on a shaft 247 parallel with the shaft 243. The pinion 246 is provided with elongated teeth 248 which extend into mesh with a pinion 249 which meshes with and drives the forty-toothed gear 232 of the next higher decimal order. By this mechanism, at each rotation of the shaft 212, controlled by mechanism previously described so that the amount of rotation is proportional to the value computed, a number is set up in the numeral wheels 239 corresponding to the computed value.

*Exhibiting mechanism.*

In order to permit the customer to see the various values indicated by the scale and in order to exhibit these values to other persons in the room to provide a check against dishonest dealings by the attendant it is desirable to provide means for exhibiting the various values on the side of the computing mechanism away from the operator. As shown in Fig. 2 the casing of the device toward the customer is provided with an opening 71 through which the weight of the article upon the scale pan is exhibited, as previously explained, and the casing is also provided with an opening 250 through which the price per pound at which the device is set appears, and also an opening 251 through which the total computed value or the amount of the sale may be seen. The figures which appear through the opening 250 are carried on a wheel 252 mounted on a stud shaft 253 supported by the frame plate 42, as shown in Figs. 5 and 6. Secured to the figure wheel 252, as shown in Figs. 5, 6 and 13 is a gear 254 which meshes with an idler 255 mounted to rotate on a shaft 256 extending between the frame plates 41 and 42. The idler 255 is driven by a gear 257 which is rotatably mounted on a shaft 258 which carries the numeral wheels 239. A numeral wheel 259 is secured to the gear 257 and a pinion 260 is also secured to the numeral wheel 259 and the gear 257 so that the three rotate in unison with one another. The pinion 260, as shown in Figs. 13 and 14, meshes with rack teeth 261 on a plate 262 connected with the upper end of the bar 112. When the bar 112 is moved by the spring 115 under control of a price key 95 which has been depressed the numeral wheel 259 will be rotated an amount proportional to the rotation of the shaft 107 controlled by the price cam depressed. A similar amount of rotation is transmitted through the gears 257, 255 and 254 to the numeral wheel 252 which is thus rotated to bring a number upon the numeral wheel 252 corresponding to the number on the price key depressed into position to be viewed through the opening 250 by the customer and others. The price per pound thus exhibited to the customer remains in view until the price key depressed is restored at the close of the operation, as will be described.

The computed value as set up in the numeral wheels 239 is also exhibited to the customer by a series of wheels 263 which are rotatably mounted on a shaft 264 carried by a pair of bracket arms 265 and 266. The bracket arms 265 and 266 are pivotally mounted on the shaft 40 and are connected by a yoke plate 267, as shown in Figs. 6, 15 and 16. Each wheel 263 has connected therewith a spur gear 268 and a ratchet wheel 269, as shown in Fig. 15. The spur gear and ratchet wheel of each set are rigidly secured to the wheel 263, and the wheel 263 is provided with a set of numerals 270 ranging from zero to 9, and the remainder of the periphery of the wheel is provided with gear teeth 271. The gear teeth 271 on each wheel 263 mesh with an idler pinion 272 mounted to rotate on the shaft 40. Each pinion 272 meshes with rack teeth 273 on a sliding bar 274 held by rods 275 extending from the bracket plate 265 to the bracket plate 266. The rods 275 pass through a slot 276 in the bars 274, and each bar 274 is provided with a coil spring 277 having its upper end secured to a flange 278 on the upper end of the bracket plate 267, as shown in Fig. 15ª. The springs 277 tend to rotate the combination gear and numeral wheels 263 in a clockwise direction, as viewed in Fig. 15, and each gear is normally held against rotation by a tooth 279 on the upper end of a lever arm 280 pivoted upon a rod 281 which is carried by downwardly extending portions 282 of the bracket arms 265 and 266. The tooth 279 engages the ratchet wheel 269 and holds the wheel 263 against rotation under influence of the spring 277. Coil springs 283 normally draw each of the levers 280 toward the ratchet wheel 269.

Each gear 268 is arranged to be moved into and out of mesh with a gear 284, and the gears 284, as shown best in Fig. 5, are carried by a series of coaxial sleeves 285, 286, 287 and 288 on shaft 256. The gear wheel 284 which is arranged to mesh with the gear wheel 268 at the extreme left of Fig. 5 also meshes with the numeral wheel 239 in the units order. The sleeve 285 forms a hub for the gear 284 which meshes with the units numeral wheel 239. Within the sleeve 285 is the next sleeve 286 which carries a second gear 284 from the left, as viewed in Fig. 5. The sleeve 286 on its opposite end is provided with a gear 289 which meshes with the numeral wheel of the ten's decimal order. The next gear 284 at the right of Fig. 5 is secured to a sleeve 287 which is connected with a gear 290 meshing with the numeral wheel 239 in the hundred's order, and the last gear 284 is connected with a sleeve 288 which carries a gear 291 at its opposite end meshing with the numeral wheel 239 in the thousand's order. By this arrangement of gears, the wheels 263 may be operated by the numeral wheels 239, but the numeral wheels are arranged in reverse order to that of their operating gears 263. The reason for this is that the wheels 263 are viewed from the opposite direction to that in which the numeral wheels 239 are viewed, so that it is necessary to have the wheels interposed so that the decimal orders may be properly arranged relative to one another. The gears 268 and 284 are normally held out of mesh with one another by a nose piece 292 on the end of the bracket arm 282. This nose piece 292 bears upon a cam 293 carried by a cam shaft 294 which is provided with a gear 295 meshing with a gear 296 on the cam shaft 90, as shown in Fig. 13. As previously explained, the cam shaft 90 is rotated one-third of a revolution at the beginning of the movement of the hand crank 20 by the teeth 93 on the mutilated gear 94. A disc 297 is secured to the cam shaft 90, as shown in Fig. 13, and is provided with notches 298 and 299. The rotation of the shaft 90 at the beginning of the operation of the device brings the notch 298 in position to be engaged by a detent 300 which is pressed against the disc 297 by a spring 301. This detent holds the cam shaft 90 stationary during the time that the counter is driven by the gear 203. After the operation of the counter is completed the cam shaft 90 is again driven by teeth 302 on the mutilated gear 94, the movement being sufficient to bring the notch 299 into engagement with the detent 300. The cam shaft is again held stationary in this position during the return of the counter to its zero position, as will be explained, after which the teeth 303 will engage the gear 92 and impart a final one-third of a revolution to the cam shaft 90 which brings it back to its original position. Since the cam shaft 294 is geared directly to the cam shaft 90 the same movement will be imparted to both shafts. During the first one-third rotation of the cam shaft 294, the nose piece 292 of the bracket 282 will rest upon the cam 293 holding the gears 268 and 284 out of mesh with one another. The nose piece 292 continues to be held by the cam 293 during the stationary period of the cam shaft 294 at the time that the counter is being operated. When the cam shaft 294 enters upon its second period of movement the nose piece 292 drops off the cam 293 and the gears 268 and 284 are brought into mesh with one another. They remain in this position during the time that the counter is being returned to its zero position so that during the return movement of the numeral wheels of the counter the wheels 263 will be driven in the direction of the arrow in Fig. 15 by the chain of gearing previously described. Each of the numeral wheels 239 is provided with four sets of numbers 240, but in clearing the counter the numeral wheels are returned backwardly, as will be explained, only a sufficient distance to bring each wheel into zero position. Consequently each numeral wheel is returned rearwardly a number of steps equal to the particular digit set up by that numeral wheel. Since each wheel 263 is rotated an amount equal to the rotation of the numeral wheel of the counter of the corresponding decimal order, it is apparent that the number 270 of Fig. 15 corresponding to the number set up in the same decimal order of the counter will appear through the opening 250 in the casing of the device. Rotation of each of the wheels 263 will drive the corresponding rack 274 downwardly through the intermediate pinion 272 against the tension of the spring 277. The wheels 263 will be held from return rotation by the detent 280 which will retain the wheels 263 in the position into which they have been rotated until the beginning of a new transaction. The cam shaft 294 is provided with a cam 305 arranged to engage the lower end of the arm 280 and force the tooth 279 out of engagement with the ratchet wheel 269 at the very beginning of the first part of the rotation of the cam shaft 294. Thus the amount of each sale remains in the device in view of the customers until a new transaction is begun.

*Printing mechanism.*

In order that a ticket may be issued showing the price at which the sale is made and the computed value of the article sold, mechanism is provided for taking an impression from the numeral wheels 239 and 259 during the time that the numeral wheels remain stationary after they have been brought to rest by the detent 222 of Fig. 10 operating upon the ratchet wheel 216 and prior to their return to zero position in a manner to be described. The printing mechanism is shown best in Figs. 6, 15 and 16. A platen 306 is carried on a shaft 307 mounted in a frame 308 which is provided with slots 309 and 310 arranged to slide upon rods 311 and 312, respectively, supported by the frame plates 41 and 42. A coil spring 313 tends to move the platen 306 into engagement with the numeral wheels 239 and 259 at their printing line. The frame 308 is normally held against movement under the influence of spring 313 by cams 314 secured to a shaft 315. The shaft 315 carries a spur gear 316 in position to mesh with the gear segment 38 on the shaft 37. The segment 38 engages the gear 316 and imparts a complete rotation thereto during the time that the numeral wheels 239 are held stationary after a computed value has been set up. At the beginning of the rotation of the shaft 315 the frame 308 is released by the cams 314 and is shot forwardly by the spring 313 to cause the platen 306 to engage the numeral wheels 239 and 259. Almost immediately after the forward movement of the frame 308 the cams 314 return the frame to its initial position after an imprint of the number set up in the counting mechanism has been taken by the impact of the platen against the numeral wheels. A ribbon 317 is interposed between the platen 306 and the numeral wheels and is wound upon spools 318 as shown in Fig. 15. One of the spools 318 is carried upon a shaft 319 provided with a beveled pinion 320 which meshes with a beveled pinion 321 secured to a stud shaft 322. The stud shaft 322 carries a ratchet wheel 323 engaged by a pawl 324 pivotally mounted at 325 on a lever arm 326. A spring 327 normally presses the pawl 324 into engagement with the teeth of the ratchet wheel 323. The shaft 315 carries a cam finger 328 arranged to engage the rocker arm 326 and imparts an oscillation thereto sufficient to cause the pawl 324 to move the ratchet wheel 323 and thus feed the ribbon forwardly after each printing operation. A strip of paper 329 passes over the platen 306 and is resiliently held thereagainst by a roller 330 pressed against the platen by a spring 331. The platen shaft 307 carries a pinion 332 as shown in Figs. 15 and 17 meshing with an idler 333 which drives a pinion 334 carried on a short shaft 335. The shaft 335 extends through an opening in the frame plate 41 and carries a pinion 336 in position to engage the segment 39 on the shaft 37. It will be seen that the segment 39 will engage the pinion 336 after the shaft 315 has been rotated to perform the printing operation. The rotation of the pinion 336 will feed the strip of paper which has received the imprint of the computed value into the position shown in broken lines in Fig. 15 so that the portion of the strip which has received the computed value may be torn off and handed to the customer or disposed of in any way desired.

*Clearing mechanism.*

After the computed value has been set up in the counter and an imprint has been taken by the printing mechanism it is, of course, desirable to return the numeral wheels to their zero position. During the computing operation some of the numeral wheels may have made several revolutions but to clear the counter it is only necessary to rotate each numeral wheel rearwardly until a zero is brought into printing line. As previously described, the drive shaft 212 for the mechanism of the units order of the counter is disconnected from the driving gear 203 at the time that the computing operation is completed. This is done by moving the pinion 210 out of mesh with the pinion 211. The rotation of the shaft 212 is arrested by the tooth 222 engaging the ratchet wheel 216. The shaft 212, as shown in Figs. 5 and 13, is provided with a star wheel 337 held by a detent 338 operated by a cam 339 on the cam shaft 90. The first movement of the cam shaft 90 releases the star wheel 337 from the detent 338 after the pinions 210 and 211 have been brought into mesh with one another. During the movement of these pinions into engagement the shaft 212 is held in fixed position by the detent 338, but the star wheel 337 is freed from the detent prior to the rotation of the shaft 212 during the driving of the counter.

A series of detents 340, Figs. 15 and 18, are provided for the star wheels 233 and these detents are held out of engagement with their star wheels during the driving of the counter by tail pieces 341 arranged to bear on cams 432 secured to the shaft 37. After the movement of the counter has been arrested the tail pieces 341 drop from the cams 342 under the influence of coil springs 343 and thus bring the detents 340 into resilient engagement with the star wheels 233. The detents 340 remain in engagement with the star wheels 233 to prevent displacement during the printing operation and also during the return of the counter to zero. The return of the counter wheels to zero is effected by segment gears 344 on shaft 37. A series of pinions 345 are mounted on the shaft 247 adjacent the pinions 246. There is one pinion 345 for each of the decimal orders of the counter above the units order. As shown in Fig. 19, a sleeve 346 is mounted on the shaft 247 and is provided with circular rack teeth 347 and with pinions 348 and 349. Collars 350 are mounted on the shaft 247 to space the other parts. The rack teeth 347 mesh with a gear segment 351 carried by a shaft 352 mounted on a bracket 353 secured to the frame plate 41, as shown in Figs. 5 and 16. The shaft 352 is provided with a crank arm 354 having a pin 355 arranged to travel in a groove 356 formed in a cam 357 secured to the shaft 37. The groove 356 is shaped so that after the completion of the printing operation the shaft 352 will be oscillated and the pinions 348, 349 and 345 will all be shifted to the left, as viewed in Fig. 19, until the pinions 349 and 345 are brought into alinement with the gear segments 344. After shifting of the pinions 349 and 345 further rotation of the shaft 37 will cause the gear segments 344 to engage their alining pinions and to rotate them in a direction to impart a reverse movement to the wheels of the counter. The sliding movement of the pinions 345 and 349 disengages the pinion 246 from the carrying pinions 244 and 245, but does not break the engagement between the pinions 246 and 249 so that motion is transmitted from the pinions 345 through the pinions 249 to the forty-toothed wheels 232 which drive the counter wheels. Each pinion 345 has one tooth cut away, as shown in Fig. 18, and when the pinion 345 has been driven by the segment 344 until the blank space in the pinion 345 comes into the line of centers of the shafts 37 and 247 the pinion 345 will cease to rotate and the segment 344 will continue its movement, leaving the pinion 345 in the position to which it has thus been moved. This position of the pinion 345 corresponds to the zero position of the numeral wheel so that no matter whether the numeral wheel has been driven one or more places from zero it will be returned to zero position and there permitted to remain. It will be held in this position by the spring detent 340.

This form of clearing mechanism is used for all of the numeral wheels above the units order, but different mechanism is used for returning the units wheel to zero position for the reason that the mechanism described requires that the pinion 249 shall always be in mesh with the gear 232. During a computing operation the gear 232 in the units order is driven at a comparatively high rate of speed and it has been found that if a smaller pinion is rotated by this gear during its operation the small pinion places a considerable drag on the rotation of the units gear. To avoid this difficulty the gear 232 in the units order has a supplemental gear 237 connected directly thereto and the gear 237 has one tooth removed at each position thereof corresponding to the zero position in the numeral wheel of the units order. The gear 237 meshes with a pinion 358 on the shaft 243 which is secured to a ten-toothed pinion 359 having elongated teeth and a star wheel 360. The pinion 358 has one tooth cut away, as shown in Fig. 16. The gears 237 and 358 occupy the position shown in Fig. 16 at the beginning of a computing operation and it will be seen that rotation of the shaft 212 may take place without driving the pinion 358. During a clearing operation the pinion 349 is operated by the gear segment 344 and will impart a complete revolution to the pinion 358 through the pinion 348 meshing with the elongated teeth of the pinion 359. This rotation of the pinion 358 will drive the pinion 237 in a reverse direction until a blank space in the teeth of the pinion 237 is reached. This, of course, restores the numeral wheel of the units order to zero. A detent 361 is held in resilient engagement with the star wheel 360 by a spring 362 to prevent overthrow of the pinion 358.

The shaft 37 carries a gear segment 365 in position to mesh with a pinion 366 on a shaft 367, as shown in Figs. 5, 13 and 14. A gear segment 368 is secured to the shaft 367 and lies in the plane of a rack bar 369 as shown in Figs. 5 and 14. The rack bar 369 is positioned between the bar 112 and the plate 42 and is provided with a spring 370 which normally draws the bar upwardly. The upward movement of the bar is limited by the pin 114, and a pin 371 carried by the bar 369 enters a slot 372 in the bar 112. During the latter part of the rotation of the shaft 37 the gear segment 365 imparts a complete rotation to the pinion 366 in a counter-clockwise direction, as viewed in Fig. 14. This causes the segment 368 to engage rack teeth 373 on the bar 369 and moves the bar downwardly the full length of the slot 372. This will pick up the bar 112 at whatever position it is in and return it to its normal or zero position. The return movement of the bar 112 will, of course, rotate the pinion 110 and the shaft 107 in a reverse direction and so restore the finger 131 to its initial position and also return the price drum 141 to zero. A cam 374 is secured to the shaft 367 and is provided with a projection 375 in position to engage a tail piece 376 secured to the shaft 106 which carries the detent bar 104. At the close of the rotation of the shaft 367 the tail piece 376 is raised by the projection 375 and thus the depressed key 95 is released. The release of the key 95 swings the universal bar 117 in position to free a dog 377 which engages a notch 378 in a disc 379 secured to the shaft 37. A spring 380 draws the dog 377 into the notch 378 and so limits the movement of the shaft 37, and consequently the rotation of the hand wheel. A dog 377 is lifted out of engagement with the notch 378 by the depression of the key 95 at the beginning of a computing operation in order to free the shaft 37 so that it may be rotated. A detent 381 is drawn by a spring 382 into contact with the periphery of a disc 383 secured to the shaft 367. The detent 381 is provided with a pointed nose piece 384 which enters a notch in the disc 383 to hold the shaft 367 in fixed position at the close of a complete revolution.

Prior to the return of the shaft 107 and the finger 131 which bears upon the price cams 132 the shaft 40 is restored to its initial position by the reverse rotation of gear wheel 46 in the manner previously described. Also, prior to the lateral movement of the finger 131 to its initial position the cam 196 as shown in Fig. 11 engages the nose piece 197 on the bracket arm 160 and moves the arm 160 against the tension of spring 195 an amount sufficient to clear the finger 131 from the faces of the price cams 132. This permits free lateral movement of the finger 131.

The clamp 73 for the scale disc 72 is released after the finger 166 has been returned to its initial position through return movement of the bracket arm 160, segment 161, and gear 162. The clamping jaws are moved backwardly by the cam 89 on the cam shaft 90 which engages cam roller 88 and moves the arm 87 against the tension of spring 91.

If it should happen that the device is operated by rotation of the hand crank 20 with no weight upon the scale pan the outer end of the contact finger 166 would be held from movement by engagement with the pin 179 since this pin would remain in its initial position in case the scale disc has not been moved. The fact that the contact finger 166 is prevented from movement holds the segment 167 and the pinion 170 stationary so that the sleeve 175 is held against movement on the shaft 163 when the sleeve is released by the lever arm 182, as previously explained. As soon therefore as the arms 189 and 219 are released by their respective cams they will be operated by their springs to disconnect the pinions 210 and 211 and to move the detent 222 into engagement with the ratchet wheel 216 so that when the gear 203 is rotated it will be disconnected from the counter and the counter will continue to be held in its zero position and the computing mechanism will continue to register zero.

The computation resulting from the operation of the device is a function of the weight of the article being weighed and the price of the substance per pound. The manner in which the price per pound and the weight are combined to obtain the desired result will be clearly seen by following one complete operation or cycle of the mechanism embodied in the device.

The rack 61, as previously pointed out, is adapted to be connected to the pan of a scale and to be moved therewith. This rack is meshed with a spur gear 62 as shown in Fig. 3, which is secured to the shaft 63. A drum calibrated to indicate weight in pounds is also secured to said shaft and revolves therewith. Thus when a substance is placed in the pan of a scale equipped with this computing device, the drum 67 will be rotated so as to indicate the true weight of the substance on the scale.

When the drum has reached a state of equilibrium and has completely come to rest, the operating handle 20, shown in Fig. 17, is revolved. It has been pointed out that the operating handle 20 passes through two complete revolutions in order to effect one complete operation of the computing device. The first portion of the first revolution of the operating handle causes the disk 72 which is secured to the shaft 63 to be locked in the jaws 73. Thus the shaft 63, the disk 65 and the weight drum 67 are held at rest.

Each price key 90 is adapted to represent a predetermined price per pound. It will be seen in Figs. 7, 9, 11 and 14 that each price key is equipped with a protruding ear 99 adapted to engage the tooth 109 on a one-tooth gear 108. It should be noted that each key is provided with a separate one-tooth gear 108 and that each tooth 109 is in a spaced-apart angular position with respect to the tooth on the adjacent gear. A shaft 107 forms a common bearing for the gears 108 and is equipped at its end with a pinion 110.

When the price key is pressed to its lowest position the one-tooth gear which has been held at rest is revolved until the tooth 109 on the same engages the ear 99 on the corresponding key 95. Thus the shaft 107 and the pinion 110 revolve therewith. Motion is transmitted to the shaft 107 by the suspended rack members 112. It will be seen in Fig. 14 that the spring 115 tends to pull the rack member 112 upwards. When the key 95 is employed the shaft 107 is unlocked and the rack member is allowed to respond to the pull of the spring. As the rack member moves it engages gearing mechanism which motivates the slidable finger 131. This finger as described is adapted to engage the faces of the cams 132. It will be seen in Figs. 4 and 11, that the finger 131 is moved to a position to engage the cam corresponding to the price key which has been employed. When the operating handle is turned further the cams are caused to revolve and the one cam which is in line to engage the finger 131 moves the same to the left. When a low price key is employed the finger 131 is positioned so as to engage a cam that is adapted to swing said finger to the left, as viewed in Fig. 11, at a comparatively rapid rate of speed. The rack 161, as shown in Fig. 11, moves in unison with said finger and hence is moved rapidly when a low price key is employed.

The pinion 162 is driven by the rack 161 and is adapted to be driven at various rates of speed depending upon which price key is employed. This pinion is secured to and rotates a shaft 163 upon which the bracket 164 is rigidly fastened. The arm 166, pivotally mounted on the bracket 164, rotates with the same until it engages the stop pin 177, as shown in Fig. 10. When the cam is held at rest against the pin 179, continued rotation of the bracket 164 causes the gear segment 167, secured to the arm 166, to move relative to the pinion 170 and thus to rotate the same and the shaft to which it is secured. By means of mechanism previously described the driving connection between the counter shaft 212 and the driving shaft 40 is broken when the pinion 170 and the shaft 171 to which it is secured are caused to rotate. Thus it is apparent that the counter mechanism is maintained at rest soon after the arm 166 engages the pin 179 on the disk 72.

When a higher price key is employed the arm 166 is moved more slowly towards the pin 179, and thus the countershaft 212 drives the counting mechanism for a longer period of time. It will be apparent that the weight of the substance on the scale pan will determine the position of the pin 179 relative to the arm 166 when the counter is at zero. Thus a heavy article will position the pin 179 further from the arm 166 than will a lighter weight and a correspondingly longer period of time will be allowed for the countershaft 212 to drive the counter mechanism.

The preliminary manipulation of the operating handle is adapted to revolve the price drum 141 after the key 95 has been employed. It will be seen in Fig. 3 that the shaft 107 is provided at its end with a bevel gear 134, which transmits motion to the shaft 136. The shaft 136 in turn transmits motion through a pair of bevel gears to the shaft 140 upon which the price drum 141 is rigidly fixed. The amount of movement imparted to the shaft 107 and hence to the price drum 141 is dependent upon the key that is employed. Thus the shaft 107 not only positions the finger 131 to engage a predetermined cam 132, corresponding to the key employed, but it also causes the price drum to be revolved so as to exhibit to the customer the price per pound of the substance being weighed.

The computing device is adapted to print the computed amount on a slip of paper as well as to exhibit the amount to the customer. During the latter portion of the operation of the handle 20 the frame 308 is released and is projected towards the periphery of the counter wheels by the spring 313, as shown in Figs. 15 and 16. The frame 308 carrying the platen 306, an inking ribbon 317 and mechanism previously described is projected against the numerals on the counter wheels after the same have come to rest. The strip of paper upon which the computed amount has been printed is moved by the pinion 336 into the position shown in Fig. 15 wherein the numeral 329 designates the paper.

When the computed amount is printed on the strip of paper the remaining operation consists of replacing the mechanism in its original position. This operation has been previously disclosed to consist of automatically releasing the detent members which maintain the numeral wheels in a fixed relation after the computing operation has been completed and driving the same along with the remaining mechanism back to its original or starting position.

The operation of the various parts has been described in connection with the construction of the parts and it is thought unnecessary to describe the operation further. It may be said, however, that it is only necessary for the attendant to place the article to be sold upon the scale pan to press the key corresponding to the price and to impart two complete revolutions to the hand crank. The device will then issue a ticket showing the price and the value and will also exhibit to the customer the weight and the price per pound and will retain in full view the computed value until the next transaction. If the customer wishes an amount which shall be of a particular value the device is first set to operate at the price of the commodity thus to be sold and the proper amount may then be placed upon the scale pan and the operator may ascertain when the required amount is upon the pan in the manner previously described. He then rotates the crank as in the ordinary operation and the ticket is issued, as previously described.

I claim:

1. In combination, a register, a prime mover for said register, means for operating said register at a fixed rate of speed relative to said prime mover, and weight controlled means for limiting the amount of movement of said register.

2. In combination, a prime mover, a register arranged to be driven by said prime mover at a fixed rate of speed relative thereto, and means for controlling the amount of movement of said register to render said amount proportional to a predetermined price per unit quantity.

3. In combination, a prime mover, a register arranged to be operated by said prime mover at a fixed rate relative thereto, weight controlled means for limiting the amount of movement of said register, and mechanism for controlling the amount of said movement to render said amount proportional to a predetermined price per unit quantity.

4. In combination, a prime mover, a register arranged to be operated by said prime mover at a fixed rate of speed relative thereto, and mechanism for limiting the amount of movement of said register so that said amount shall be proportional to the weight of an article and to a predetermined price per unit weight.

5. In combination, a prime mover, a register driven by said prime mover at a fixed rate relative thereto, a movable member moved by said prime mover, and means for arresting the movement of said register when said movable member has traveled a distance proportional to the weight of an article.

6. In combination, a prime mover, a register operated by said prime mover at a fixed rate relative thereto, a movable member operated by said prime mover, means for arresting the movement of said register when said movable member has traveled an amount proportional to the weight of an article, and means for varying the speed ratio between said prime mover and said movable member.

7. In combination, a driving device, a counter operated by said driving device at a fixed speed relative thereto, a movable member operated by said driving device, weight controlled means for causing the arrest of the movement of said counter when said movable member has traveled a distance proportional to the weight of an article, and means for varying the speed ration between said driving device and movable member so that said ratio shall differ for different prices per unit quantity.

8. In combination, a driving device, a counter operated by said driving device at a fixed speed relative thereto, a movable member arranged to be operated by said driving device at different rates relative thereto, and means controlled by said movable member for arresting the movement of said counter.

9. In combination, a driving device, a counter arranged to be operated thereby at a fixed speed relative thereto, means for arresting the movement of said counter, a movable member for controlling said counter-arresting means, weight controlled means for cooperating with said movable member to cause the arrest of said counter when said movable member has traveled a distance proportional to the weight of an article, and means for controlling the speed of said movable member so that said speed shall be inversely proportional to the price per unit weight of said article.

10. In combination, a counter, means for driving said counter, means for arresting the movement of said counter, and a plurality of price cams for operating said motion-arresting means.

11. In combination, a counter, means for driving said counter, means for arresting the movement of said counter, a movable member for controlling said motion-arresting means, and a plurality of price cams for driving said movable member.

12. In combination, a counter, means for driving said counter, means for arresting the movement of said counter, a movable member for causing said counter-arresting means to be actuated when said movable member has traveled a predetermined distance, and a plurality of price cams for operating said movable member at different rates of speed.

13. In combination, a counter, means for arresting the movement of said counter, a movable member for controlling said counter-arresting means, weight controlled means cooperating with said movable member to cause said counter-arresting means to be actuated when said movable member has traveled a distance proportional to the weight of an article, and a plurality of price cams for driving said movable member at various rates of speed inversely proportional to different prices per unit weight.

14. In combination, a prime mover, a counter arranged to be driven by said prime mover at a fixed rate relative thereto, means for arresting the movement of said counter, a movable member for controlling said counter-arresting means, weight controlled means for cooperating with said movable member to cause said counter-arresting means to be actuated when said movable member has traveled a distance proportional to the weight of an article, a plurality of price cams, means for moving said price cams at a fixed rate relative to said prime mover, and means arranged to selectively cooperate with said price cams to operate said movable member at different rates of speed corresponding to different prices per unit weight.

15. In a computing device, a counter, mechanism for controlling the operation of said counter, a plurality of price cams for actuating said controlling mechanism, and means for selectively cooperating with said price cams for driving said controlling mechanism from said price cams.

16. In a computing device, a counter, mechanism for controlling the operation of said counter, a plurality of price cams, and means movable into and out of position to selectively cooperate with said price cams for actuating said controlling mechanism.

17. In a computing device, a plurality of price cams arranged side by side and having corresponding portions thereof arranged in alinement, a member arranged to be operated by said price cams, and means for moving said member adjacent the alined portions of said cams into position to cooperate with a predetermined one of said cams.

18. In a computing device, a plurality of price cams, a driven member arranged to selectively cooperate with said price cams to be driven thereby, means for moving said driven member relative to said price cams into and out of position to cooperate with any one of said cams, and means for holding said driven member out of engagement with said cams while it is being positioned relative thereto.

19. In a computing device, a counter, means for controlling the operation of said counter, a plurality of cams for actuating said controlling means, a member arranged to cooperate with said cams to transmit motion therefrom to said controlling means, means for shifting said member relative to said cams to bring said member into and out of position to cooperate with different ones of said cams, and price keys for controlling the movement of said member relative to said cams.

20. In a computing device, a plurality of price cams, a member movable relative to said cams into position to cooperate with various ones of said cams, a spring for moving said member into contact with said cams, and means for holding said member out of engagement with said cams during the movement of said member relative thereto.

21. In combination, a prime mover, a counter, a gear train for operating said counter from said prime mover, means operable at different rates of speed relative to said prime mover for breaking said gear train to permit the arrest of said counter while said prime mover continues to operate, and means for arresting the operation of said counter while said prime mover continues to operate.

22. In combination, a driving device, a counter, means for operating said counter from said driving device, means for disconnecting said counter from said driving device, and means for positively arresting the operation of said counter while said counter is still operatively connected with said driving device.

23. In combination, a counter, a driving device for said counter, mechanism for disconnecting said counter from said driving device to permit movement of said driving device independently of said counter, and means for positively arresting the movement of said counter prior to the disconnection of said counter from said driving device.

24. In combination, a driving device, a counter arranged to be driven thereby, yielding means for permitting movement of said driving device relative to said counter while said driving device and counter are operatively connected to one another, and means for positively arresting the movement of said counter while said driving device is operatively connected therewith.

25. In combination, a counter, means for driving said counter, means for arresting the movement of said counter, said arresting means being arranged to permit slight movement of said driving means after the operation of said arresting means, and means for returning said driving means to the position it occupied at the time of the operation of said arresting means.

26. In combination, a counter, a member resiliently connected therewith, means for arresting the movement of said member while permitting slight movement of said counter after the arrest of said member, and means operable after the arrest of said member for bringing said counter to the position it occupied relative to said member prior to the arrest thereof.

27. In combination, a counter, driving mechanism for said counter, and positively acting arresting mechanism for said counter operable while said counter is operatively connected with said driving mechanism.

28. In combination, a counter, means for driving said counter, a member connected with said counter, resilient means for holding said member in a definite position relative to said counter, and means for positively arresting said member while permitting slight continuation of the movement of said counter, said resilient means acting to restore the relative position of said member and counter.

29. In combination, a counter, a member connected therewith, resilient means for holding said counter and member in a definite position relative to one another, means for driving said counter, and means for positively arresting the movement of said member and subsequently disconnecting said driving means from said counter.

30. In combination, a counter, means for driving said counter, a movable member connected with said counter, resilient means for holding said movable member and counter in position relative to one another, means for arresting said movable member to limit the movement of said counter, and means for disconnecting said counter from said driving means subsequent to the arresting of said movable member.

31. In combination, a counter, a movable member connected with said counter, means for arresting said movable member while said counter continues to operate, and means for returning said counter to the position it occupied at the time of the arrest of said movable member.

32. In combination, a counter, a movable member connected with said counter, means for driving said counter, means for arresting said movable member while said counter continues to operate, means for subsequently disconnecting said counter from said driving means, and means for returning said counter to the position it occupied at the time of the arrest of said movable member.

33. In combination, a counter, means for driving said counter, a gear train for connecting said counter to said driving means, a ratchet wheel movably connected with said counter, a spring and stop for holding said ratchet wheel in a definite position relative to said counter, means for arresting the movement of said ratchet wheel, and means for subsequently disconnecting said gear train from said counter to permit said counter to be returned by said spring to the position it occupied relative to said ratchet wheel at the time of the arrest of said ratchet wheel.

34. In combination, a counter, driving means for said counter, trip mechanism for arresting said counter, means for disconnecting said driving means from said counter; and mechanism for successively operating said trip mechanism and disconnecting means to arrest the movement of said counter when it has traveled an amount proportional to a computed value.

35. In combination, a counter, means for driving said counter, means for arresting the movement of said counter, trip mechanism for successively operating said arresting means and disconnecting said driving means from said counter, and mechanism for causing the operation of said trip mechanism when said counter has moved an amount proportional to the product of the weight of an article and the price per unit pound of said article.

36. In combination, a counter, a shiftable gear train for operating said counter, means for shifting said gear train to make and break the driving connection with said counter, and weight controlled means for actuating said gear shifting means and means for varying, according to different prices, the time of actuation of said gear shifting means by said weight controlled means.

37. In combination, a counter, a gear train for driving said counter, ratchet mechanism for arresting the movement of said counter, a lever for shifting said gear train, a second lever for operating said ratched mechanism, and weight controlled means for actuating said levers.

38. In combination, a counter, a gear train for operating said counter, ratchet mechanism for arresting the movement of said counter, a lever for disconnecting said gear train from said counter, a lever for operating said ratchet mechanism, and means for controlling said levers to cause successive operation thereof when said counter has moved an amount proportional to the value of an article.

39. The combination with registering mechanism, of driving means therefor, a weight controlled member, and a movable member arranged to co-operate with said weight controlled member for controlling said computing mechanism, said movable member being arranged to travel at different rates of speed relative to the rate of speed of the driving means for said computing mechanism.

40. The combination with registering mechanism, of a weight controlled member arranged to move a distance proportional to the weight of an article, a movable member arranged to travel the same distance as said weight controlled member for controlling said registering mechanism, and means for varying the rate of travel of said movable member relative to the speed of said registering mechanism so that said movable member shall travel at different rates for different prices per unit weight of an article.

41. The combination with registering mechanism, of a weight controlled member arranged to be moved a distance proportional to the weight of an article, a movable member arranged to travel in the path of said weight controlled member an amount equal to the movement of said weight controlled member for controlling said registering mechanism, means for varying the rate of travel of said movable member, and means for shifting said movable member into and out of the path of said weight controlled member.

42. The combination with registering mechanism, of a weight controlled member arranged to be moved a distance proportional to the weight of an article, a movable member arranged to co-operate with said weight controlled member to control said registering mechanism, means for driving said registering mechanism, and a variable speed connection between said driving means and said movable member.

43. The combination with a register, of a weight controlled member arranged to move a distance proportional to the weight of an article, means for driving said register, a movable member arranged to cooperate with said weight controlled member for controlling the movement of said register, and means for preventing operation of said register by said driving means when said weight controlled member has not been operated.

44. The combination with a register, of a weight controlled member arranged to move a distance proportional to the weight of an article, means for driving said register, a follower arranged to cooperate with said weight controlled member to control the operation of said register, and means controlled by said follower for preventing operation of said register by said driving means when said weight controlled member has not been operated.

45. The combination with a register, of driving means therefor, a weight controlled member arranged to move a distance proportional to the weight of an article, a follower for said weight controlled member, means for moving said follower into and out of the path of said weight controlled member and for operatively connecting said register with its driving means, and means for preventing movement of said follower into the path of said weight controlled member and for preventing operative connection between said register and its driving means when said weight controlled member has not been operated.

46. The combination with a register, of a weight controlled member arranged to move a distance proportional to the weight of an article, driving means for said register, a follower movable into and out of the path of said weight controlled member, and means for operatively connecting said register with its driving means when said follower is moved into the path of said weight controlled member, said follower being arranged to engage said weight controlled member to prevent movement thereof into the path of said member and to prevent operative connection between said register and its driving means when said weight controlled member has not been operated.

47. The combination with registering mechanism, of a weight controlled member having a stop thereon arranged to move in the arc of a circle, and a follower for said stop arranged to travel about the center of movement of said stop and also arranged to swing about a center removed from the center of movement of said stop to bring said follower into and out of the path of said stop.

48. The combination with registering mechanism, of a weight controlled member having a stop thereon arranged to travel in the arc of a circle, a supporting bracket arranged to rotate about the center of said arc, a follower arm pivoted to said supporting bracket at one side of said center and arranged to swing about its pivot into and out of the path of said stop, and trip mechanism for controlling said registering mechanism arranged to be actuated by the movement of said follower arm about its pivot.

49. The combination with a register, of means for driving said register, trip mechanism for controlling the operation of said register, a weight controlled member arranged to travel in the arc of a circle, a bracket arranged to swing about the center of said arc, a follower arm pivoted to said bracket at a point removed from the center of said arm, means for swinging said follower arm about its pivot to bring it into the path of movement of said weight controlled member, means for rotating said bracket to cause said follower arm to engage said weight controlled member and be moved thereby about its pivot, and means for operating said trip mechanism when said follower arm is so moved about its pivot.

50. In a computing device, a plurality of numeral wheels each having a plurality of sets of numbers thereon, means for clearing said numeral wheels by rotating each wheel in a reverse direction to zero position, and exhibiting mechanism arranged to be operated by said numeral wheels during the clearing operation thereof.

51. A computing device comprising numeral wheels each having a plurality of sets of figures ranging from zero to nine, means for rotating each of said numeral wheels in a reverse direction to bring said numeral wheels to the nearest zero position thereof to effect a clearing operation, and an exhibiting device comprising a numeral wheel for each of the numeral wheels of said computing device, and means for operatively connecting the numeral wheels of said exhibiting device with the numeral wheels of said computing device during a clearing operation to bring a number in each numeral wheel of said exhibiting device into view corresponding to the number set up in the numeral wheel of the computing mechanism prior to the clearing operation.

52. In a computing device, a drive shaft, means for rotating said drive shaft, a secondary drive shaft, means operated by said first-mentioned drive shaft for imparting partial rotation to said secondary drive shaft in reverse directions at spaced intervals and computing mechanism driven by said secondary drive shaft and moved through different phases of its operation during the movement of said secondary drive shaft in opposite directions.

53. In a computing device, an operating shaft, a pair of gear segments connected with said operating shaft to rotate in unison therewith, a secondary drive shaft, a pinion connected with said secondary drive shaft and arranged to mesh with one of said gear segments to impart a partial rotation to said secondary drive shaft, an idler for driving said pinion, and means arranged to mesh with another segment on said operating shaft to rotate said idler and impart a partial rotation to said secondary drive shaft in a reverse direction and at a spaced interval relative to the first partial rotation of said secondary drive shaft and computing mechanism operated by said secondary drive shaft.

In testimony whereof I have signed my name to this specification on this 9th day of December, A. D. 1919.

OTTO MALCHER.